(12) United States Patent
Sheehan

(10) Patent No.: US 12,191,570 B2
(45) Date of Patent: Jan. 7, 2025

(54) VARIABLE EXTERNAL STRUCTURES ON SYSTEMS FOR SIGNATURE MANAGEMENT

(71) Applicant: The United States of America, as represented by the Secretary of the Navy, Crane, IN (US)

(72) Inventor: Matthew M. Sheehan, Washington, DC (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 367 days.

(21) Appl. No.: 17/894,689

(22) Filed: Aug. 24, 2022

(65) Prior Publication Data

US 2023/0064088 A1 Mar. 2, 2023

Related U.S. Application Data

(60) Provisional application No. 63/236,338, filed on Aug. 24, 2021.

(51) Int. Cl.
*H01Q 17/00* (2006.01)
(52) U.S. Cl.
CPC ................. *H01Q 17/005* (2013.01)
(58) Field of Classification Search
CPC ..................................... H01Q 17/005
See application file for complete search history.

(56) References Cited

U.S. PATENT DOCUMENTS

| | | | | |
|---|---|---|---|---|
| 5,398,032 A | * | 3/1995 | Tucker | F41J 2/00 342/9 |
| 5,969,660 A | * | 10/1999 | Veazey | B63C 9/00 342/10 |

* cited by examiner

*Primary Examiner* — Vladimir Magloire
*Assistant Examiner* — Maxine Mckenzie Phillips
(74) *Attorney, Agent, or Firm* — Naval Surface Warfare Center, Crane Division; Christopher Feigenbutz

(57) ABSTRACT

Provided is an apparatus and method for radar calibration that utilizes external shielding structures to be constructed around the body frame of a system to manage external signature presence and block unwanted signal emissions and intrusions. The inventive structures can adapt to desired user requirements or to environmental change as needed. The variable shielding with isolating connectors to the body frame of the system allows for aerodynamic needs to be sustained due to the mesh design while also protecting against electromagnetic spectrum interference and electro-optical short wave and long wave infrared signature emissions. The shielding can also be formed to emit a known or desired radio frequency response based on geometric shapes in order to influence radar cross-section readings. Communication with external environment is completed through the use of the shielding as a series of antennas.

15 Claims, 47 Drawing Sheets

FIGURE TITLE – CONTROL SURFACE DIAGRAM, L0 SYSTEM; TOWED OR RAT POWERED; RUDDERS Y-POSITION

FIGURE TITLE – CONTROL SURFACE DIAGRAM, L0 SYSTEM; TOWED OR RAT POWERED; RUDDERS X-POSITION

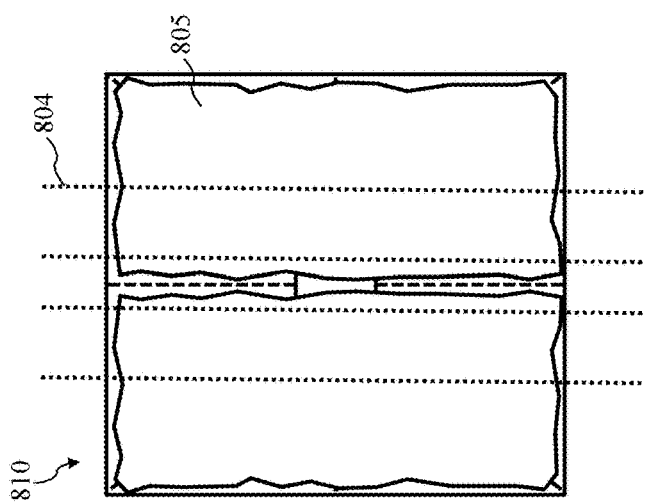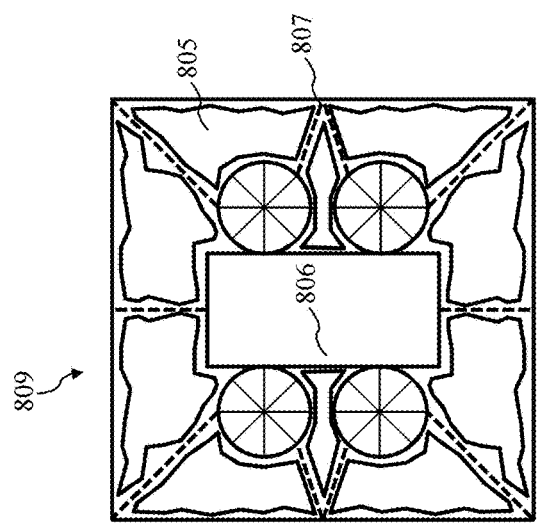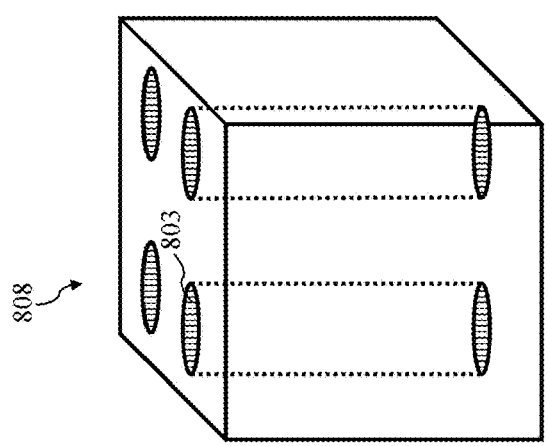
FIG. 8B
FIGURE TITLE – ELECTRO-OPTIC/INFRARED INTERNAL BLENDING STRUCTURES; SHAPE CUBE

VARIABLE EXTERNAL STRUCTURES ON SYSTEMS FOR SIGNATURE MANAGEMENT

CROSS-REFERENCE TO RELATED APPLICATIONS

The present application claims priority to U.S. Provisional Patent Application Ser. No. 63/236,338, filed Aug. 24, 2021, entitled "VARIABLE EXTERNAL STRUCTURES ON SYSTEMS FOR SIGNATURE MANAGEMENT," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention is assigned to the United States Government and is available for licensing for commercial purposes. Licensing and technical inquiries may be directed to the Office of Technology, Naval Surface Warfare Center Port Hueneme Division, email: Alan.w.jaeger@navy.mil or phone (805) 205-0638.

FIELD OF THE INVENTION

The field of invention relates generally to radio and optical systems. More particularly, it pertains to a method of conducting radar and lidar calibrations where signature management of the target is of importance. The frequency classes this invention covers are contained within the radio and optical spectrums within the electromagnetic spectrum. Specifically, within the radio spectrum (0 Hz-300 GHz), the following bands are of relevance: Extremely Low Frequency (ELF), Super Low Frequency (SLF), Ultra Low Frequency (ULF), Very Low Frequency (VLF), Low Frequency (LF), Medium Frequency (MF), High Frequency (HF), Very High Frequency (VHF), Ultra High Frequency (UHF), Super High Frequency (SHF), and Extremely High Frequency (EHF). Specifically, within the optical spectrum (300 GHz-300 PHz), the following bands are of relevance: Far Infrared (FIR), Mid Infrared (MIR), Near Infrared (NIR), Visible, Near Ultraviolet (NUV), and Extreme Ultraviolet (EUV).

BACKGROUND

The current method of conducting external calibration for the AN/SPY radar equipped on U.S. Navy AEGIS ships involves the release of a series of target spheres borne by meteorological balloons. This method has proved to be unpredictable, uncontrollable, time inefficient, cost ineffective, and in the case of AEGIS Ashore external radar calibration, a safety concern.

The current method of conducting external calibration for radar systems involves the release of several target sphere borne by meteorological balloons mounted on towers, or suspended by aircraft via tow-cables. These static shaped targets are inflexible to changing calibration targets, uncontrollable, time inefficient, cost ineffective, and pose safety concerns.

The internal and external calibration tests for Ballistic Missile Defense (BMD) equipped AEGIS ships are vital to the day-to-day performance of the AN/SPY Radar System. The test objective is to verify the basic functionality of the BMD Radar System. Calibration is performed on all radar arrays and all driver/pre-driver combinations. Though these time-consuming tests can take as long as eight hours to fully complete, a ship's ability to support a mission is dependent on the passage of these tests.

Ballistic Missile Defense Signal Processor Calibration (BSP Cal) is required when any of the following periodicities or situations occur: 1) Semi-annually, 2) 72 hours prior to entering a BMD environment, or 3) After initial installation of a new computer program. Other situations can arise that would necessitate a ship to conduct a BSP Cal. These include: 1) The Internal Calibration Update Maintenance Requirement Card (MRC) indicates a failure, 2) After transmitter maintenance or realignment that affects the Driver/Pre-Driver (D/PD) phasing, or 3) After replacement of a BSP Synthesizer. External calibration generally follows internal calibration, without any transmitter maintenance allowed in between.

The External Calibration Test of the BSP is a dedicated test. This means that no other events are to be run in parallel. The event involves the launch of several balloon-borne 14" metallic spheres. The spheres present the ship with an external target whose signal amplitude does not fluctuate, as well as a reference signal to calibrate the onboard equipment and sensors. This external signal allows the system to minimize the interference effects of free-space and other artifacts inherent in signal processing. Using a synthetic signal to conduct external calibration tests would not allow the system to negate all these effects.

The balloon-borne spheres are usually launched from the ship deck. After launch, ship maneuvering may be required to adjust course and speed to place the balloons in the proper perspective during the entire event. The spheres are tracked on each array face between designated ranges that cover an area of 10 NM by 10 NM. Because the event must be run in a clear environment (free of clutter) to avoid incorporating a large, unknown propagation loss in the measurements, it is usually conducted at-sea and away from land. The sphere tracks must be maintained within ±30° from the center of the array face and at a range greater than 6 NM at the start of calibration. Even though the balloon is intentionally under inflated to allow it to expand as it climbs in elevation, unpredictable environmental conditions will sometimes carry the balloons away too quickly or cause the balloons to burst. The majority of the eight-hour duration of the test is primarily attributed to waiting for the radar targets to reach minimum test range/altitude to start the calibration process.

The success of the calibration test is highly dependent upon the environment. The environment dictates the pace of the testing as well as how many target spheres need to be launched from the ship in order to complete the test successfully. At-sea testing offers greater flexibility than ashore testing due to the ability of the ship to maneuver to keep the targets centered within each array face. The ashore structure does not have the ability to maneuver, and thus is dependent even more so upon a "cooperating" environment. Another factor that limits ashore calibration testing is safety. At-sea testing benefits from being conducted in an area that is isolated from occupied space. When the meteorological balloons reach a great enough altitude, they burst and the 14" metallic sphere then falls back to the ocean. Ashore testing does not benefit from being conducted in an area that is isolated from occupied space. The resulting 14" metallic sphere that returns to Earth's surface must be tracked and controlled in some fashion to avoid posing a risk to property and human life.

BSP External Calibration consists of a series of four tests. External Calibration tests must be run in the specified order of: Pulse Train Calibration (PTC), Medium Band Radar Cross Section Calibration (MB RCS Cal), Synthetic Wide Band Radar Cross Section Calibration (SWB RCS Cal), and then finally Coherent Integration Radar Cross Section Calibration (CI RCS Cal). The calibration process is controlled by the Radar System Controller (RSC) operator. In the case where the BSP requires a reset or reboot, the entire series of tests must be restarted and run from beginning to end. The system is capable of performing automatic verifications of the calibration results. Once a test and its verification process are completed, the results are burned to the BSP memory.

Factors relevant to calibration include the particular driver/pre-driver combination (T20/T21/T22; T23/T24/T25), the transmitter isolation and power output, whether the BSP synthesizer was recently replaced, and whether there is a mod deck casualty (failed crossed-field amplifiers (CFA's) in the Transmitter). These factors can affect the BSP's pulse train signal level and these in turn will affect the radar cross-section of targets. In addition, the calibration results are very specific to a hardware configuration. Changes in any of the factors will cause the Operational Readiness Test System's (ORTS) Calibration Verification to change from pass to fail. However, this change from pass to fail status can be used as an indicator that the previously calibrated configuration has somehow changed.

In Anti-Air Warfare (AAW), the focus lies in determining the range of a target. Amplitude and Phase errors are fairly well behaved within an operating band (no special calibration is needed). In AAW, only one band is used at a time, whereas the BMD pulse uses the entire frequency spectrum in a single pulse. This approach is called Synthetic Wideband—the signal processor pieces together the ten individual frequency bands to form a single band that covers the entire operating range of the AN/SPY radar.

In BMD, however, the focus lies in discriminating multiple ballistic objects—to identify the true threat from the decoys. The synthetic wideband is able to provide a higher range resolution than what the system is able to achieve using the AAW waveforms. It also provides something called the Range-Doppler Intensity (RDI) image of a target. The RDI processing removes interferences from the radar pulse's side lobes as well as other artifacts so that only the true target remains.

In order to obtain the best results from the synthetic wideband image signal processing, the External BSP Calibration is required. This is one reason, if not THE reason, why the external calibration is so vital to the overall performance of the BSP. The metallic sphere used in the external calibration provides the radar with a single, clean track. Regardless of the physical orientation of the sphere, its radar "image" is always a circle. This provides the system with a reference signal. The radar's calibration bursts are composed of the entire 400 MHz spectrum. However, the individual bursts use only a small portion of the spectrum. These bursts are then synthetically combined by the BSP to form a single image across the entire spectrum—hence, the synthetic wideband term.

There are two types of pulse calibration, Pulse Train Calibration and Pulse Calibration. In Pulse Train Calibration, estimates of amplitudes and phases at specific frequencies over the whole 400 MHz are obtained. These first order "errors" are removed to form a fine range and Doppler target image with low side lobes. The second, Pulse Calibration, then removes second-order errors by pushing the side lobes even lower. In this manner, only the target is tracked while other artifacts are suppressed as much as possible.

A sphere is used for calibration due to the uniform radar cross section (RCS) reflected back to the AN/SPY array face no matter the current position or orientation of the sphere. A sphere is preferred in the current method due to the lack of control of the environment when the balloons are released for the test. If a flat plate is used, the calibration test requires control over that flat plate to ensure it is kept at the same angle at all times to the array face. The amount of variables to compensate for grows dramatically with this target shape change (ship movement, winds, wave motion, etc.). Due to the limitations of controlling another radar target shape consistently given environment variables is not possible; the choice to stay with a spherical target was made. Changing the size of the 14" sphere is also not possible due to it being cost and time prohibitive, and requiring a code change to the radar computer program.

The U.S. Navy is equipped with multiple sensors and effectors that require calibration. These systems are not limited to the radio band within the electromagnetic spectrum. Thus a technology gap has been identified for a system that has the capability of aiding in the calibration of multi-electromagnetic spectral systems, can adapt its emission characteristics to specific needs, be piloted remotely/autonomously/directly with positive control, and can control/tune its own emissions signals while protecting itself from external electromagnetic interference.

SUMMARY OF THE INVENTION

The present invention relates to an apparatus and method for radio and optical spectrum calibration that utilizes external shielding structures to be constructed around the body frame of a system to manage external signature presence and block unwanted signal emissions and intrusions. The inventive structures can adapt to desired user requirements or to environmental change as needed. The variable shielding with isolating connectors to the body frame of the system allows for aerodynamic needs to be sustained due to the mesh design while also protecting against electromagnetic spectrum interference and allow for electro-optical short wave and long wave infrared signatures to blend with the environmental surroundings. The shielding can also be formed to emit a known or desired radio frequency response based on geometric shapes in order to influence radar cross-section readings. Communication with external environment is completed through the use of the shielding as a series of antennas, optical links, or through tethered lines depending on system configuration.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 5L shows the basic components of the alternative system configuration where the system is controlled via a wired tether tow cable from an aerial platform with a calibration stabilizer relay in-between.

FIG. 5O shows the basic components of the calibration stabilizer relay's flight control surfaces, independent of on-board or provided power, detailing the aileron and rudder flight control surfaces.

FIG. 7I shows a three dimensional view of a dynamic structure configuration in a triplet wire and actuator cell group.

FIG. 8B shows a three dimensional, top down cutaway, and profile cutaway view of the system with the electro-optic/infrared internal blending system deployed with in a dynamic cubic configuration.

DETAILED DESCRIPTION OF THE DRAWINGS

Figure 1A:
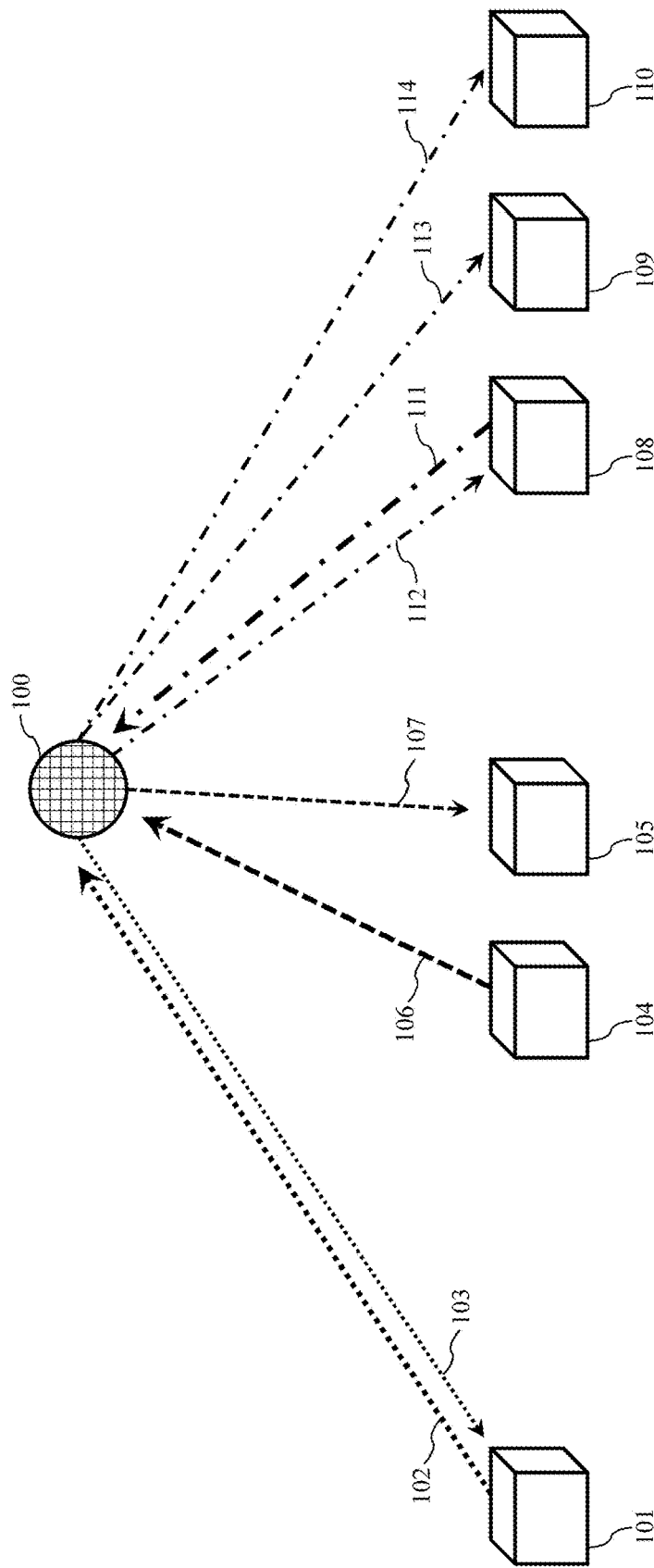
FIG. 1A shows the basic principles of Radio Detection and Ranging (RADAR) for the calibration of monostatic, bistatic, and multistatic detection, localization, tracking, and recognition systems.

The embodiments of the invention described herein are not intended to be exhaustive or to limit the invention to precise forms disclosed. Rather, the embodiments selected for description have been chosen to enable one skilled in the art to practice the invention.

Generally, provided is a radio and/or optical frequency signature management and calibration system comprising: one or more radio and optical frequency emitter sources; one or more radio and optical frequency receiver destinations; and a target system comprising: a power receiving, generation, distribution, storage and control subsystem; a propulsion control subsystem; a flight stabilization and control subsystem; a communications subsystem; a command and control subsystem; a payload management subsystem; a structure management subsystem; a sensor collection, reporting, and feedback subsystem; and a mission tasking management subsystem; wherein said one or more radio and optical frequency emitter sources comprises an external radio and optical frequency structure mesh shield comprising gaps that are spaced to achieve total reflection in order to mimic a radar return of a solid object while still allowing for air to flow through said external mesh shield to enhance aerodynamics, reduce drag, and blend its electro-optical/infrared signature with the background environment.

In one illustrative embodiment, said target system manages external radio and/or optical signature presence; manages external radio and optical signature presence; mitigates and blocks unwanted external signal intrusions and undesired internal target system signal emissions; maintains aerodynamic requirements for control surfaces and propulsion thrust flows to ensure stable flight; and executes user and/or mission tasking and payload deployment autonomously, semi-autonomously, and/or manually. In one illustrative embodiment, said target system comprises a power receiving, generation, distribution, storage, and control subsystem; wherein said subsystem controls on-board target system for power via battery, photovoltaic, and/or combustion; controls off-board target system second or third party provided power via wireless radio and/or optical transfer methods or via tethered cable, cord, and/or fiber. In one illustrative embodiment, said target system propulsion control subsystem comprises a first operating profile for target system transit, loiter, hover, take-off, and landing for target system configurations; and a second operating profile for towed cable, cord, and/or fiber.

In one illustrative embodiment, said target system flight stabilization and control subsystem controls target system control surfaces to ensure flight stability for said first operating profile; and controls target system calibration stabilizer relay for target system configuration powered via said second operating profile. In one illustrative embodiment, said target system communications subsystem controls external target system data link interfaces with base or mobile command and control stations; controls radio frequency communication antenna pattern, design, spacing, orientation, protocol, transmit/receive windows, and frequency allocation; and controls optical frequency communication waveform, power level, beam intensity, beam pattern, orientation, protocol, transmit/receive windows, and frequency allocation.

In one illustrative embodiment, said target system command and control subsystem manages said subsystems within said target system to include scheduling, task execution, system fault detection and isolation, on-board resource allocation, sensor integration, mission execution, and payload deployment; records data for post-event construction and/or analysis; executes target system self-harm protection override; and executes target system abandonment safety procedures and security protections.

In one illustrative embodiment, said target system payload management subsystem controls the scheduling, monitoring, stowage, fault detection and isolation, deployment, assessment, and tear-down of internal payloads within the target system structure; and controls the scheduling, monitoring, stowage, fault detection and isolation, deployment, and assessment of external payloads to the target system structure.

In one illustrative embodiment, said target system structure management subsystem controls static and dynamic target system structure interface points to said target system body; interfaces with said communication subsystem to schedule signature control and calibration windows to mitigate undesired target system operation; and controls dynamic operation of said target system structure to ensure proper shaping and frequency management via gap spacing size. In one illustrative embodiment, said target system sensor collection, reporting, and feedback subsystem monitors and reports data and information related to device orientation, distance, state, fault detection and isolation issues, environmental interactions to a requesting subsystem or external system requestor; executes and validates sensor readings on a scheduled, ad-hoc, as-needed/request, and/or random interval; monitors, reports, and recommends target system operating state changes due to malfunction, exploitation, and/or abandonment; and records sensor data for post-event construction and/or analysis.

In one illustrative embodiment, said target system mission tasking management subsystem executes all relevant mission files detailing required tasking; manages and de-conflicts competing and/or conflicting mission tasking; and updates and adapted to dynamic mission tasking.

In one illustrative embodiment, said target system manages external radio and optical signature presence by ensuring a gap size of a radio frequency structure mesh shield to be a fraction of an inspection or calibration frequency wavelength; adjusting said gap size of said radio frequency structure mesh shield to be a fraction of said inspection or calibration frequency wavelength through tightening or loosening of individual wire dynamic structure cells; adjusting said gap size of said radio frequency structure mesh shield to be a fraction of said inspection or calibration frequency wavelength through shortening or lengthening of individual actuator dynamic structure cells; orienting said target system radio frequency structure mesh shield return surface to said receiver destination(s) for desired radar signature detection and measurement; reshaping said target system radio frequency structure mesh shield return surface to said receiver destination(s) for desired radar signature detection and measurement through changing of individual wire and actuator dynamic structure cells and their supporting control arms; coating said radio frequency structure mesh shield, wire and actuator dynamic structure cells, supporting control arms, and target system internals with electro-optical/infrared treatments to match said inspection or calibration frequency wavelength; controlling electro-optical/infrared emitting diodes embedded within said wire and actuator dynamic structure cells to said inspection or calibration frequency wavelength; tuning ionized gas plasma chambers embedded within said wire and actuator dynamic structure cells to said inspection or calibration frequency wavelength; inflating said electro-optical/infrared blending structure within said radio frequency structure mesh shield to encapsulate said target system internals while maintaining aerodynamic and propulsion flow requirements for flight stability and control; controlling said target system radio frequency structure mesh shield to create communication antennas of various frequencies to provide external communication with said target system; controlling said electro-optical/infrared emitting diodes embedded within said wire and actuator dynamic structure cells to provide external communication with said target system; and controlling said ionized gas plasma chambers within said wire and actuator dynamic structure cells to provide external communication with said target system. In one illustrative embodiment, said target system mitigates and blocks unwanted external signal intrusions and undesired internal target system signal emissions by adjusting a gap size of a radio frequency structure mesh shield to be a fraction of an unwanted signal frequency wavelength through tightening or loosening of individual wire dynamic structure cells; adjusting said gap size of said radio frequency structure mesh shield to be a fraction of said unwanted signal frequency wavelength through shortening or lengthening of individual actuator dynamic structure cells; adjusting power isolation coupling characteristics attaching said target system internals to said radio frequency structure mesh shield; adjusting said ionized gas plasma chambers within wire and actuator dynamic structure cells for maximum signal absorption; controlling said target system radio frequency structure mesh shield to continuously adjust communication antenna frequencies; controlling electro-optical/infrared emitting diodes embedded within said wire and actuator dynamic structure cells to continuously adjust a communication frequency; and controlling said ionized gas plasma chambers within said wire and actuator dynamic structure cells to continuously adjust said communication frequency.

In one illustrative embodiment, said target system maintains aerodynamic requirements for control surfaces and propulsion thrust flows to ensure stable flight target system self-control of throttle, yaw, pitch, and roll for all operating profiles except said second operating profile; by controlling upper and lower inboard ailerons, upper and lower outboard ailerons, red ailerons, center ailerons, green ailerons, upper rudders, center rudders, lower rudders, red and green inboard rudders, green and red outboard rudders, and their associated tabs control surfaces within said target system radio frequency structure mesh shield for the second operating profile; and by controlling said red and green ailerons, red and green rudders and associated tabs control surfaces on a calibration stabilizer relay for the second operating profile.

In one illustrative embodiment, said target system executes user and/or mission tasking and payload deployment autonomously, semi-autonomously, and/or manually utilizing static or dynamic onboard mission data file execution; sensor feedback for target system health, status, location, collision avoidance, fault detection and isolation, and abandonment procedures; and coordination with other entities through various onboard communication methods.

FIG. 1A shows the basic principles of Radio Detection and Ranging (RADAR) for the calibration of monostatic, bistatic, and multistatic detection, localization, tracking, and recognition systems. The components shown in FIG. 1A are as follows: 100—Target to be investigated by each RADAR system type by measuring RADAR cross-section (RCS); 101—Monostatic RADAR system type where it transmits (TX) a radio frequency (RF) wave, 102, and then receives (RX) the reflected RF wave, 103, off of 100 to measure the RCS; 104—TX component of a bistatic RADAR system type where it TX a RF wave, 106, and then RX the reflected RF wave, 107, off of 100 is measured by the RX component of the bistatic RADAR system type, 105; 108—TX component of a multistatic RADAR system type where it TX a RF wave, 111, and then RX the reflected RF wave itself, 112, off of 100. The multistatic RADAR system type also has multiple other RX components, 109 and 110, who also respectively RX the reflected RF wave, 113 and 114, off of 100. All these components work together to measure RCS.

Figure 1B:
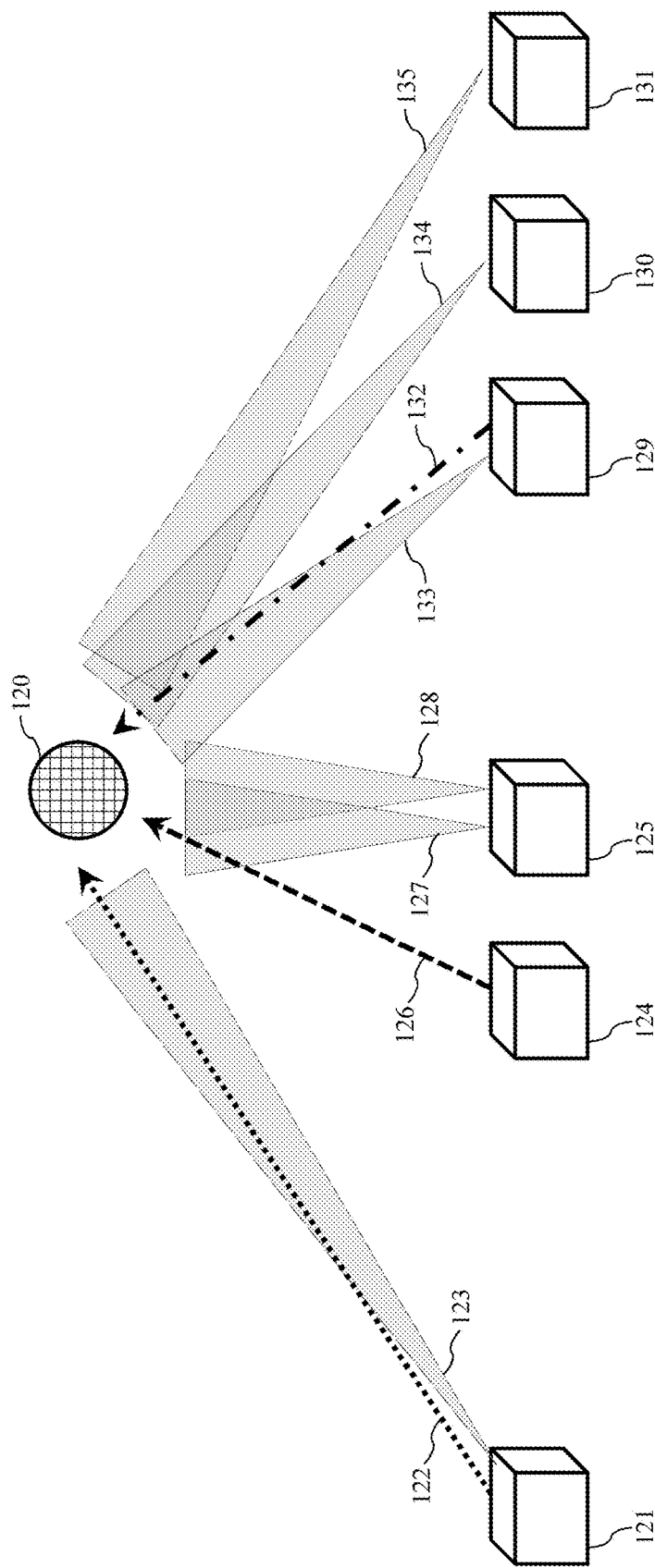
FIG. 1B shows the basic principles of optical detection and ranging (sometimes referred to as light/laser detection and ranging, LIDAR) for the calibration of monocular, binocular, and multiocular detection, localization, tracking, and recognition systems.

FIG. 1B shows the basic principles of optical detection and ranging (sometimes referred to as light/laser detection and ranging, LIDAR) for the calibration of monocular, binocular, and multiocular detection, localization, tracking, and recognition systems. The components shown in FIG. 1B are as follows: 120—Target to be investigated by each LIDAR system type by measuring LIDAR cross-section (LCS); 121—Monocular LIDAR system type where it TX an optical frequency (OF) wave, 122, and then measures the RX OF wave, 123, off of 120; 124—TX component of a binocular LIDAR system type where it TX an OF wave, 126, to be reflected by 120 and measured by the RX component of the binocular LIDAR system type, 125, through two separate measurement sensors, 127 and 128; 129—TX component of a multiocular LIDAR system type where it TX an OF wave, 132, and then measures the RX reflected OF wave itself, 133, off of 120. The multiocular LIDAR system type also has multiple other RX measurement components, 130 and 131, who also respectively measure the RX OF wave, 134 and 135, off of 120. All of these components work together to measure LCS.

Figure 2A:
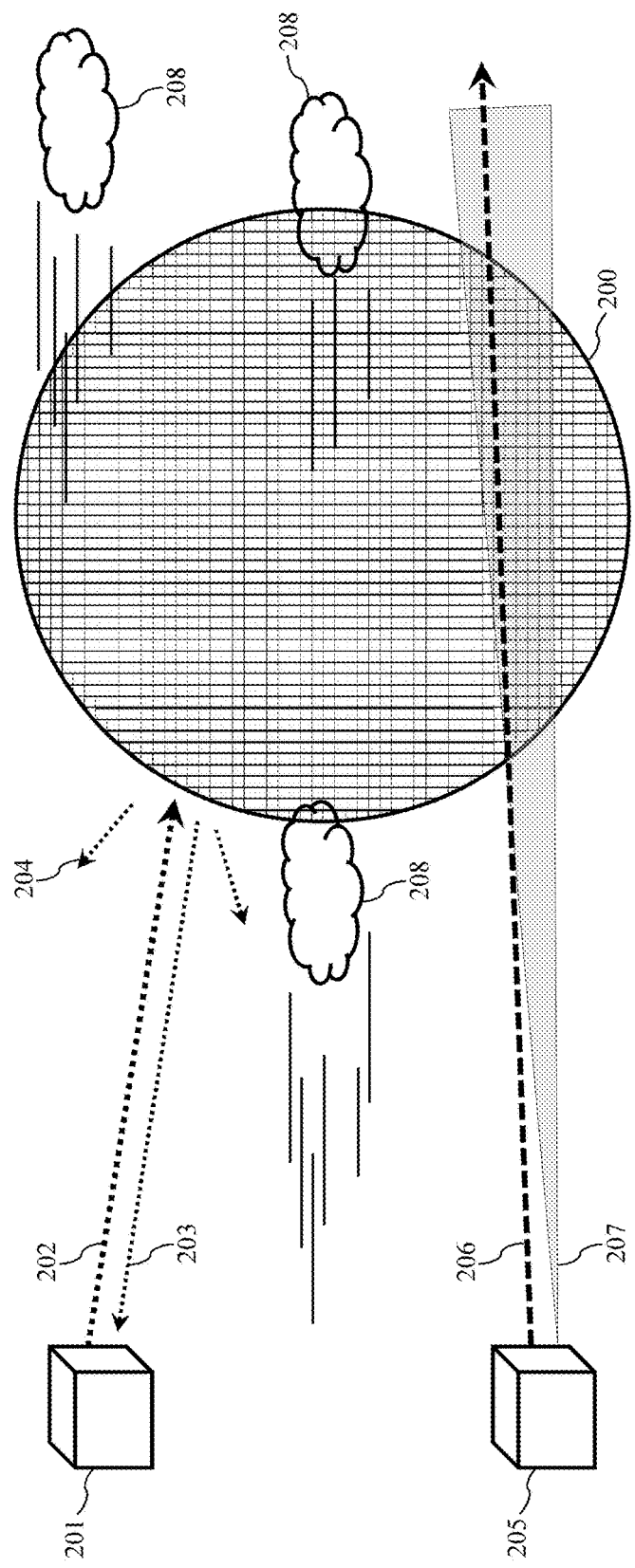
FIG. 2A shows the basic principles of signature management for a system reflective in the radio spectrum and semitransparent in the optical spectrum.

FIG. 2A shows the basic principles of signature management for a system reflective in the radio spectrum and semitransparent in the optical spectrum. The components shown in FIG. 2A are as follows: 200—Target to be investigated by a RADAR, 201, and a LIDAR, 205, system. 200 is constructed in such a way the structure is a mesh wire frame structure whose gaps are spaced to achieve total reflection and thus mimic a solid sphere RADAR return, 203, from the TX RF waves, 202. 200 is an isotropic radiator, thus the TX RF waves, 202, from 201 will not all be reflected back to 201 for RX. This results in some of the TX RF waves, 202, to be reflected away, 204. Due to the mesh wire frame structure of 200, environmental and atmospheric conditions, 208, are able to pass through 200 unimpeded. Additionally, the LIDAR system, 205, will have trouble detecting and measuring 200 as the inbound OF wave, 206, may pass through 200 causing the OF measurement and detection sensor, 207, to only see the background environment of 208.

Figure 2B:
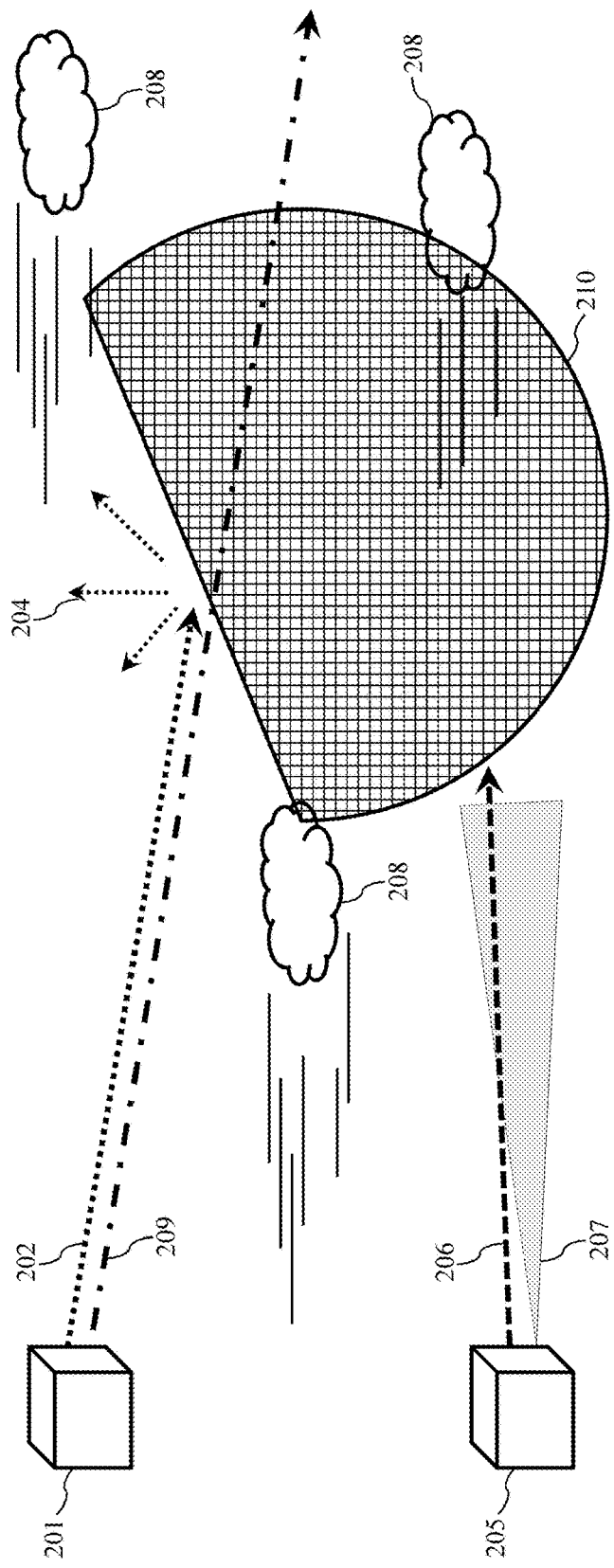
FIG. 2B shows the basic principles of signature management for a system semitransparent in the radio spectrum and reflective in the optical spectrum.

FIG. 2B shows the basic principles of signature management for a system semitransparent in the radio spectrum and reflective in the optical spectrum. The components shown in FIG. 2B are as follows: 210—Target to be investigated by a RADAR, 201, and a LIDAR, 205, system. 210 is constructed in such a way the structure is a mesh wire frame structure whose gaps are spaced to achieve total reflection, 204, in the direction away from 201 or allow maximum pass through, 209, from the TX RF waves, 202 and 209. Due to the mesh wire frame structure of 210, environmental and atmospheric conditions, 208, are able to pass through 210 unimpeded. In this configuration, the LIDAR system, 205, will not have trouble detecting and measuring 210 as the inbound OF wave, 206, will reflect off of 210 OF measurement and detection sensor, 207, to detect 210 distinct from the background environment of 208.

Figure 3:
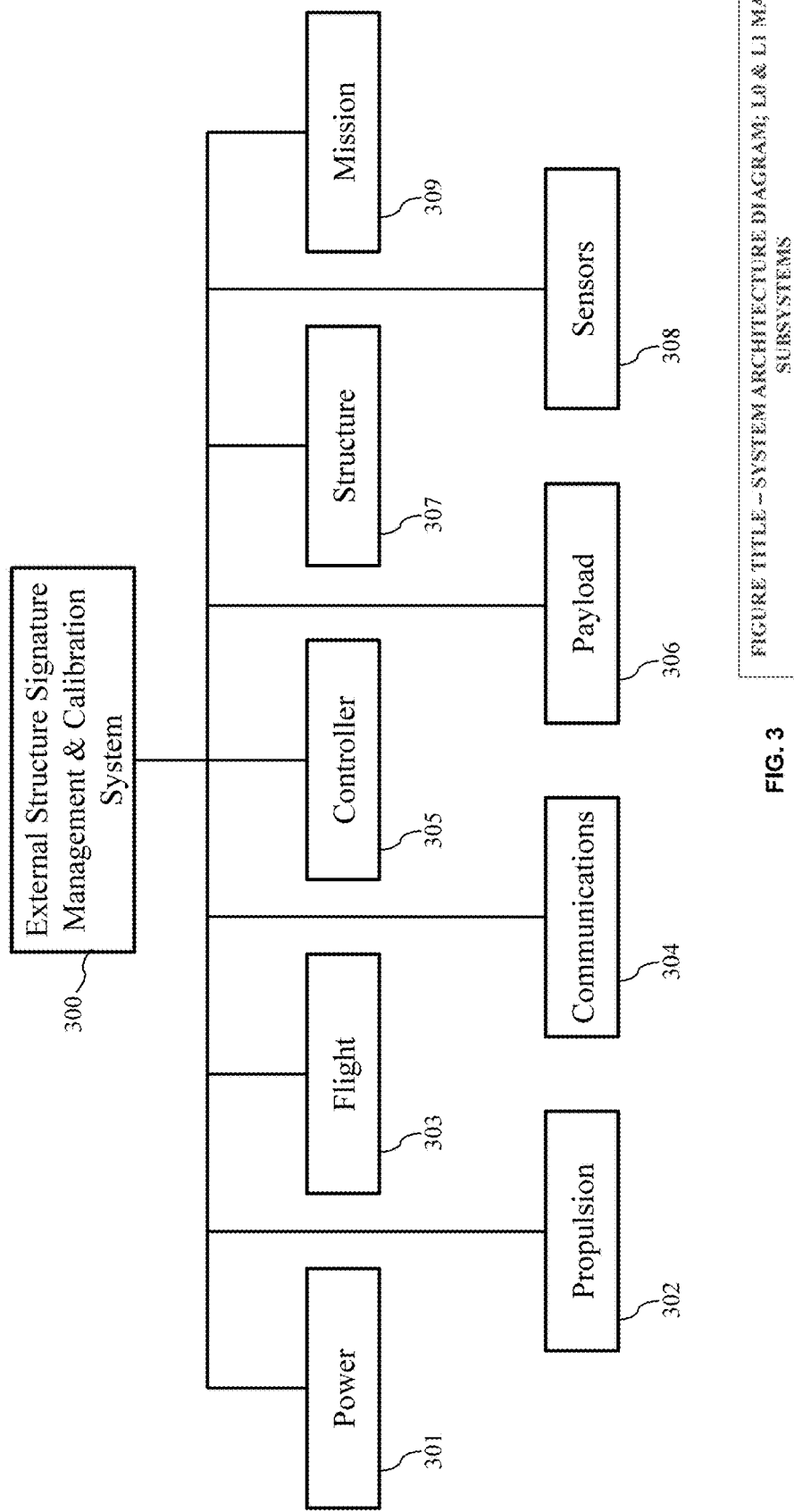
FIG. 3 shows the system's architecture decomposed into its nine major subsystems.

FIG. 3 shows the system's architecture decomposed into its nine major subsystems. The components shown in FIG. 3 are as follows: 300—The level 0 definition of the system to be decomposed into its level 1 major functional subsystems; 301—Power subsystem, manages all energy needs and requirements for the 300. Power can be stored onboard within 300 or provided externally; 302—Propulsion subsystem, manages all self-contained movement requirements for 300 to ensure safe and effective operation for a given task; 303—Flight subsystem, manages all aerodynamic controls for 300 to include stability, loiter, transit, mission path, take-off and landing operations to ensure safe and effective operation for a given task; 304—Communications subsystem, manages all command and control internally and externally for 300 to include subsurface, surface, ground, air, and space messages for mission tasking; 305—Controller subsystem, manages and arbitrates internal system functions for 300 to ensure the overall system prioritizes requests and functions from all subsystems for safe and effective operation for a given task; 306—Payload subsystem, manages and controls the requirements for an installed payload on 300 to include unique operating needs; 307—Structure subsystem, manages and controls the external structure of 300 to meet mission requirements for a given task. This includes external structure shaping; 308—Sensors subsystem, manages and controls all sensors on 300 to include altimeters, accelerometers, and proximity events to name a few; 309—Mission subsystem, manages and controls overall operation of 300 tasking for a given mission.

Figure 4A:
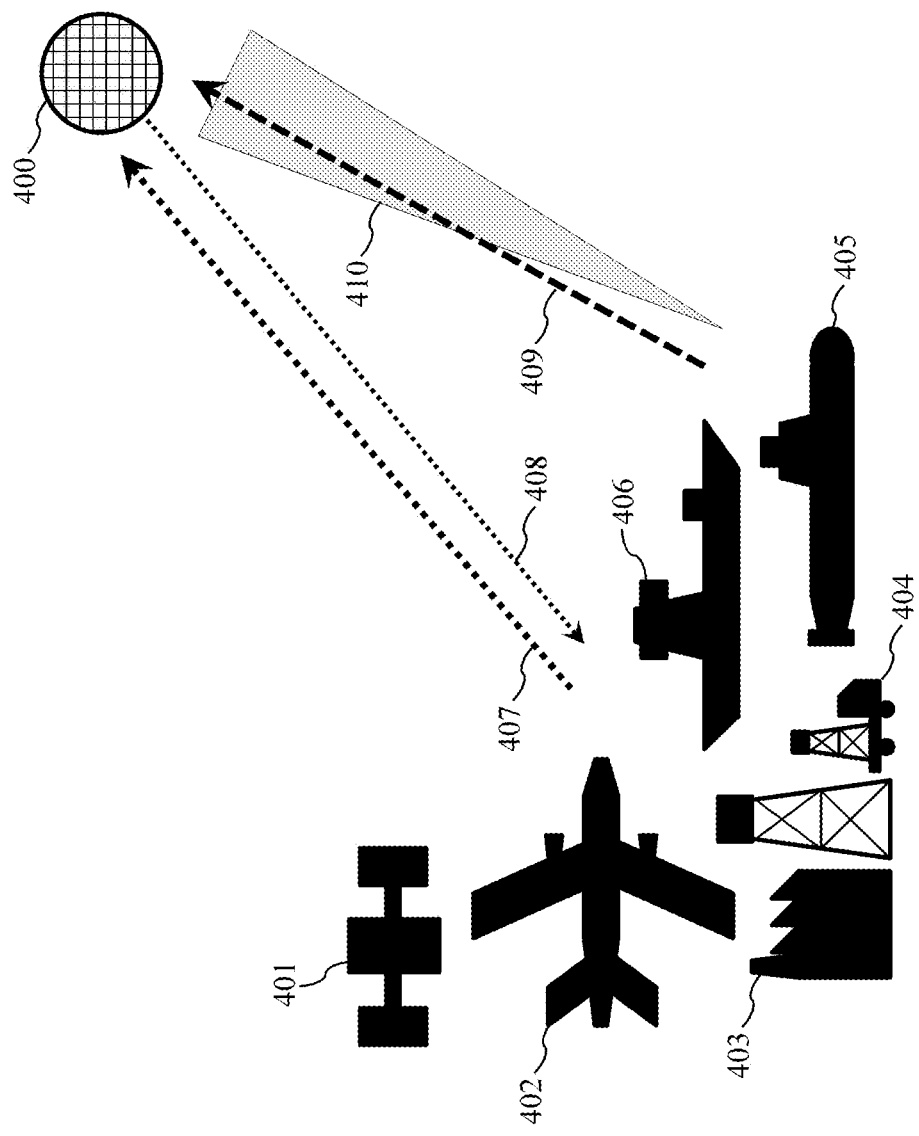
FIG. 4A shows an alternative system configuration where the system is under its own power and is being inspected by one or more platforms from one or more operational domains using one or more frequencies within the radio and optical spectrum.

FIG. 4A shows an alternative system configuration where the system is under its own power and is being inspected by one or more platforms from one or more operational domains using one or more frequencies within the radio and optical spectrum. Components shown in FIG. 4A are as follows: 400—Target system to be inspected/detect by RADAR and/or LIDAR systems under own power, stored of generated; 401—Space-based platform with RADAR and/or LIDAR system; 402—Airborne platform with RADAR and/or LIDAR system; 403—Fixed ground platform with RADAR and/or LIDAR system; 404—Mobile ground platform with RADAR and/or LIDAR system; 405—Subsurface platform with RADAR and/or LIDAR system; 406—Surface platform with RADAR and/or LIDAR system; 407—TX RF wave to inspect/detect 400 by RADAR system; 408—Reflected RF wave off of 400 to be RX by RADAR system; 409—TX OF wave to inspect 400 by LIDAR system; 410—LIDAR system detection/measurement system for RX reflected OF wave.

Figure 4B:
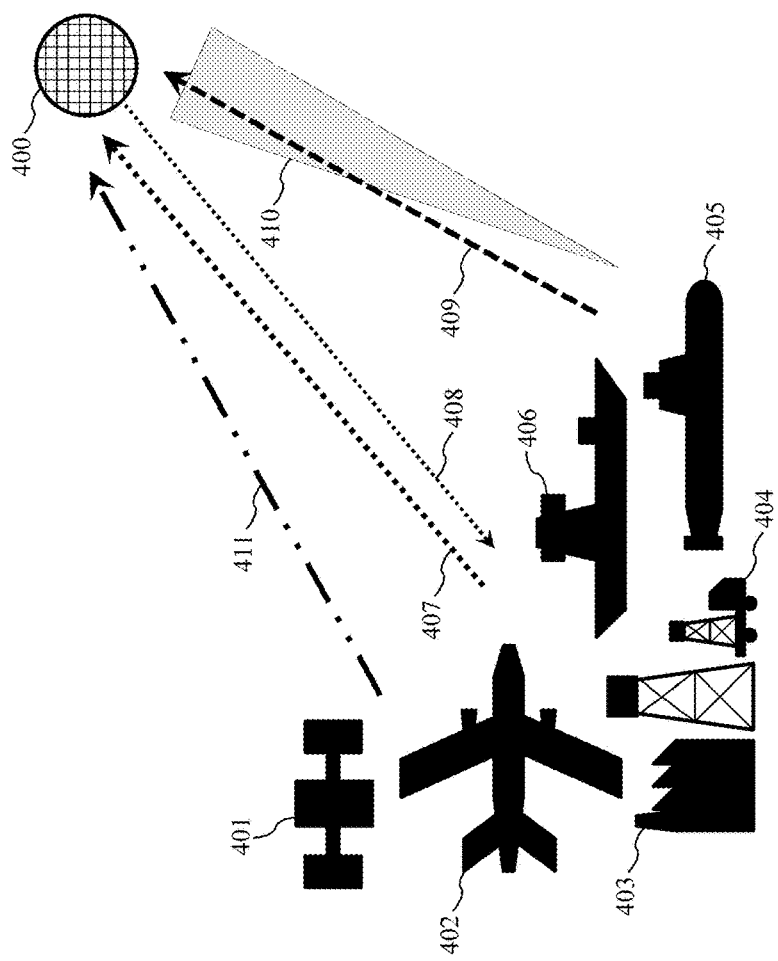
FIG. 4B shows an alternative system configuration where the system is provided external power wirelessly via the radio spectrum from a platform and is being inspected by the aforementioned platform from one or more operational domains using one or more frequencies within the radio and optical spectrum.

FIG. 4B shows an alternative system configuration where the system is provided external power wirelessly via the radio spectrum from a platform and is being inspected by the aforementioned platform from one or more operational domains using one or more frequencies within the radio and optical spectrum. Components shown in FIG. 4B are as follows: 400—Target system to be inspected/detect by RADAR and/or LIDAR systems and provided power externally from 401, 402, 403, 404, 405, and 406 in the radio spectrum via wireless link, 411.

Figure 4C:
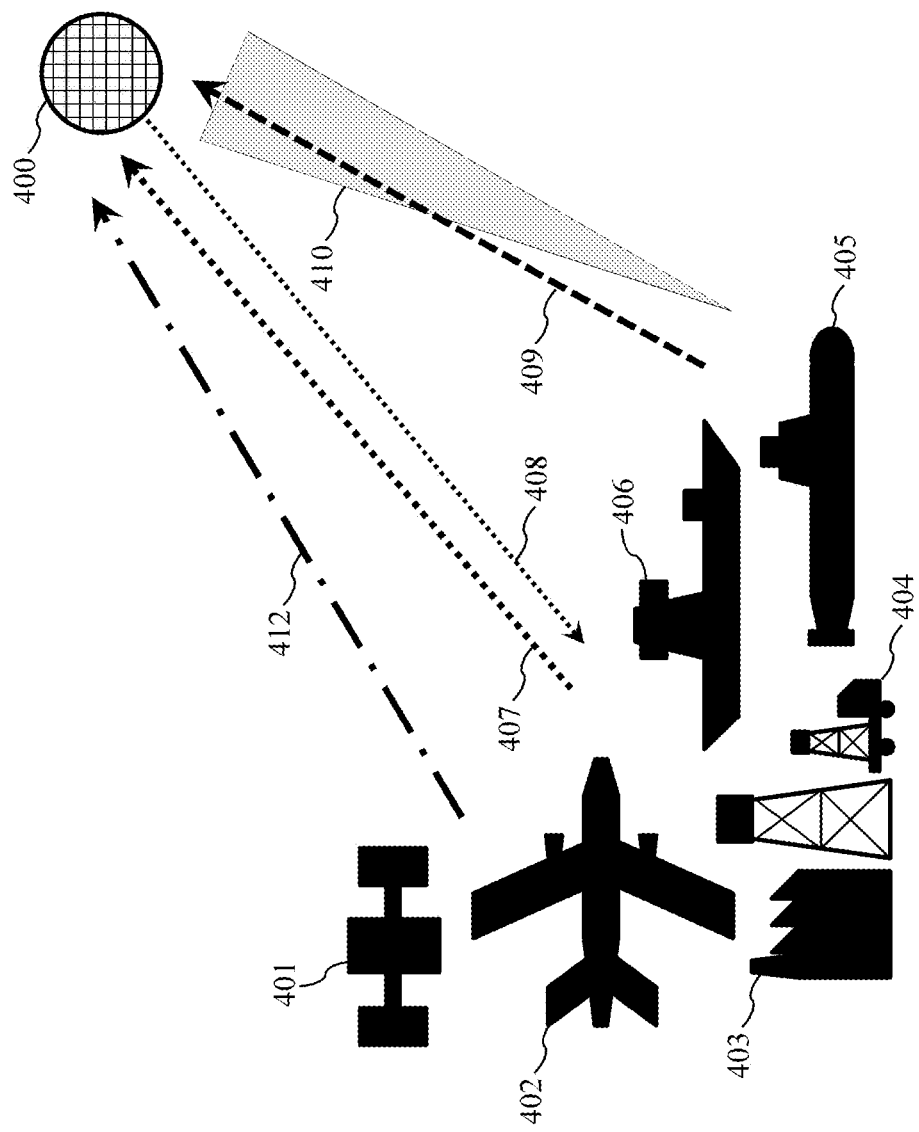
FIG. 4C shows an alternative system configuration where the system is provided external power wirelessly via the optical spectrum from a platform and is being inspected by the aforementioned platform from one or more operational domains using one or more frequencies within the radio and optical spectrum.

FIG. 4C shows an alternative system configuration where the system is provided external power wirelessly via the optical spectrum from a platform and is being inspected by the aforementioned platform from one or more operational domains using one or more frequencies within the radio and optical spectrum. Components shown in FIG. 4C are as follows: 400—Target system to be inspected/detect by RADAR and/or LIDAR systems and provided power externally from 401, 402, 403, 404, 405, and 406 in the optical spectrum via wireless link, 412.

Figure 4D:
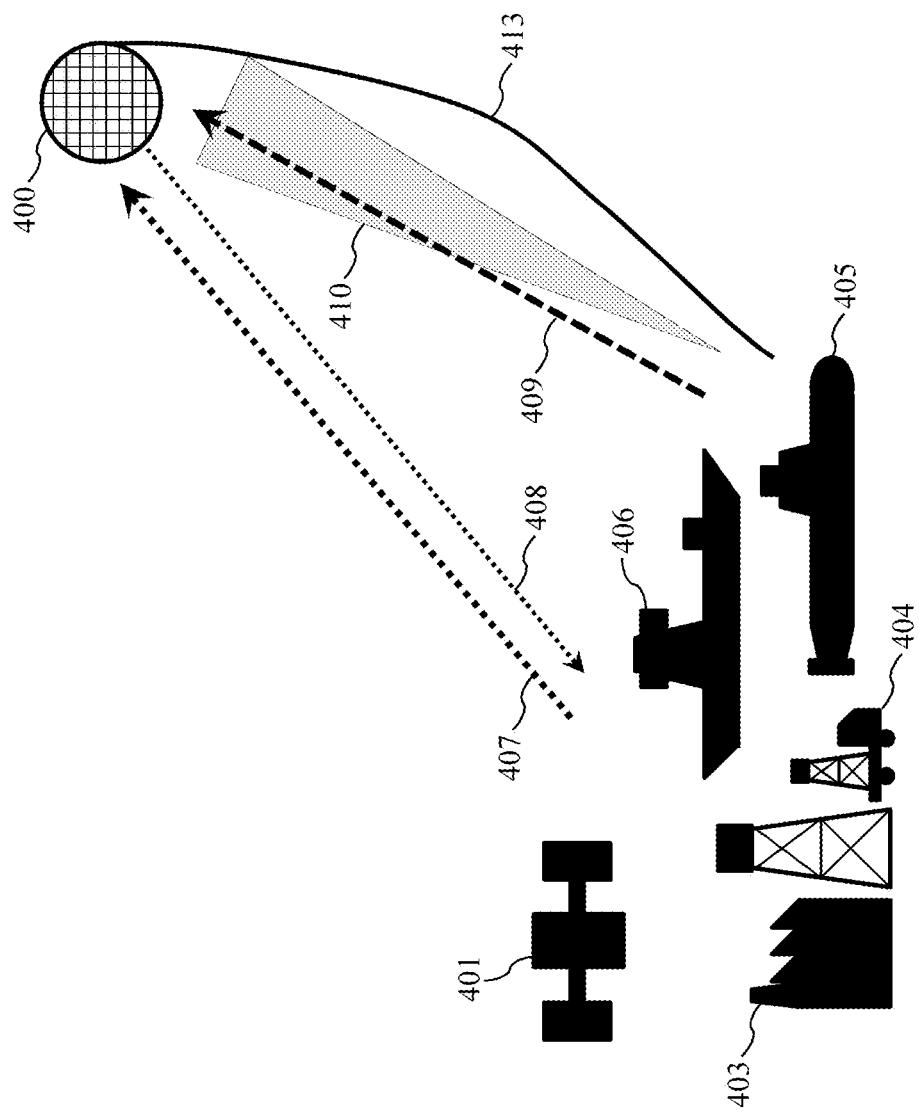
FIG. 4D shows an alternative system configuration where the system is provided external power via a wired tether from a platform and is being inspected by the aforementioned platform from one or more operational domains using one or more frequencies within the radio and optical spectrum.

FIG. 4D shows an alternative system configuration where the system is provided external power via a wired tether from a platform and is being inspected by the aforementioned platform from one or more operational domains using one or more frequencies within the radio and optical spectrum. Components shown in FIG. 4D are as follows: 400—Target system to be inspected/detect by RADAR and/or LIDAR systems and provided power externally from 401, 403, 404, 405, and 406 via tether, 413.

Figure 4E:
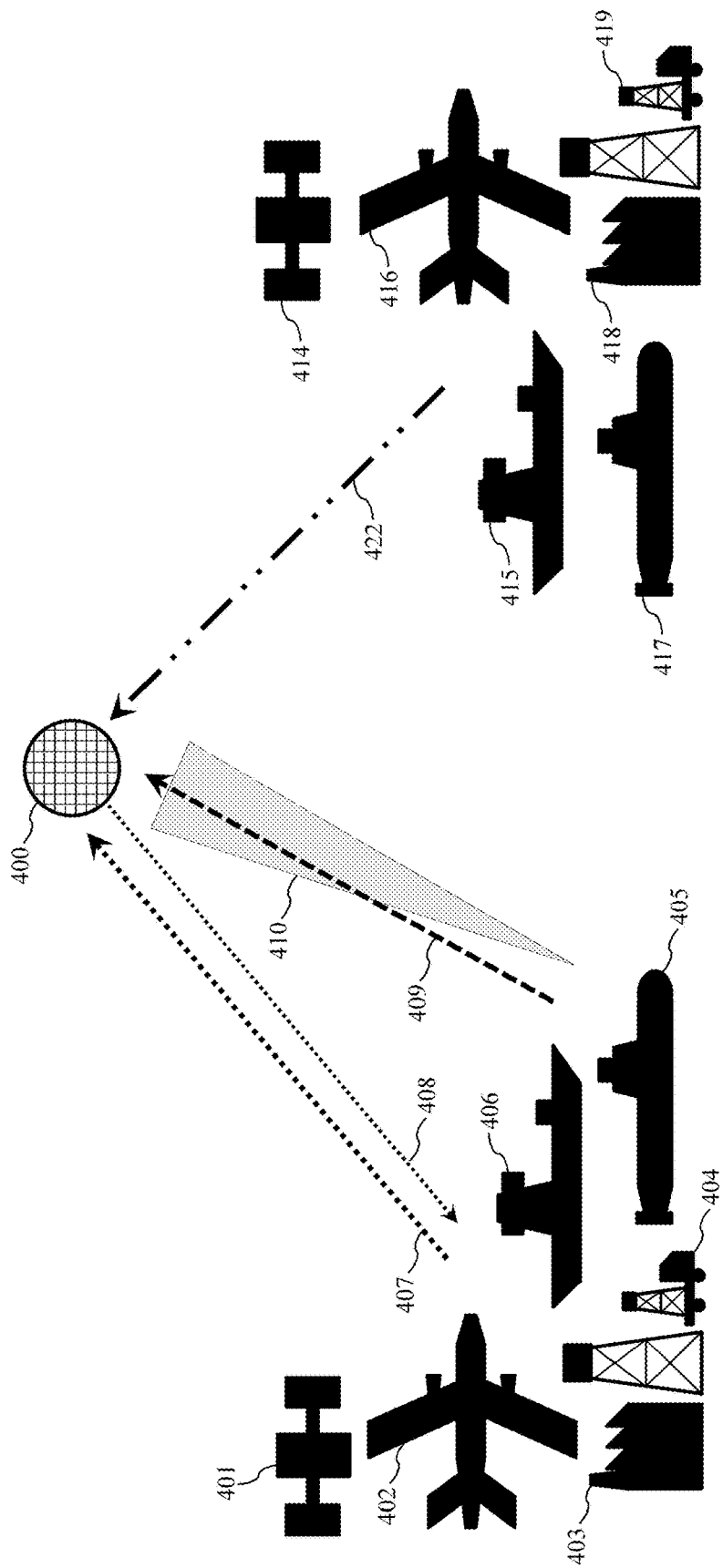
FIG. 4E shows an alternative system configuration where the system is provided external power wirelessly via the radio spectrum from a platform and is being inspected by a different platform from one or more operational domains using one or more frequencies within the radio and optical spectrum.

FIG. 4E shows an alternative system configuration where the system is provided external power wirelessly via the radio spectrum from a platform and is being inspected by a different platform from one or more operational domains using one or more frequencies within the radio and optical spectrum. Components shown in FIG. 4E are as follows: 400—Target system to be inspected/detect by RADAR and/or LIDAR systems under external power; 414—Space-based platform providing power to 400 for inspection/detection by RADAR and/or LIDAR systems on 401, 402, 403, 404, 405, and 406; 415—Surface platform providing power to 400 for inspection/detection by RADAR and/or LIDAR systems on 401, 402, 403, 404, 405, and 406;

416—Airborne platform providing power to 400 for inspection/detection by RADAR and/or LIDAR systems on 401, 402, 403, 404, 405, and 406; 417—Subsurface platform providing power to 400 for inspection/detection by RADAR and/or LIDAR systems on 401, 402, 403, 404, 405, and 406; 418—Fixed ground platform providing power to 400 for inspection/detection by RADAR and/or LIDAR systems on 401, 402, 403, 404, 405, and 406; 419—Mobile ground platform providing power to 400 for inspection/detection by RADAR and/or LIDAR systems on 401, 402, 403, 404, 405, and 406; 422—External power provided to 400 in the radio spectrum via wireless link from 414, 415, 416, 417, 418, and 419.

Figure 4F:
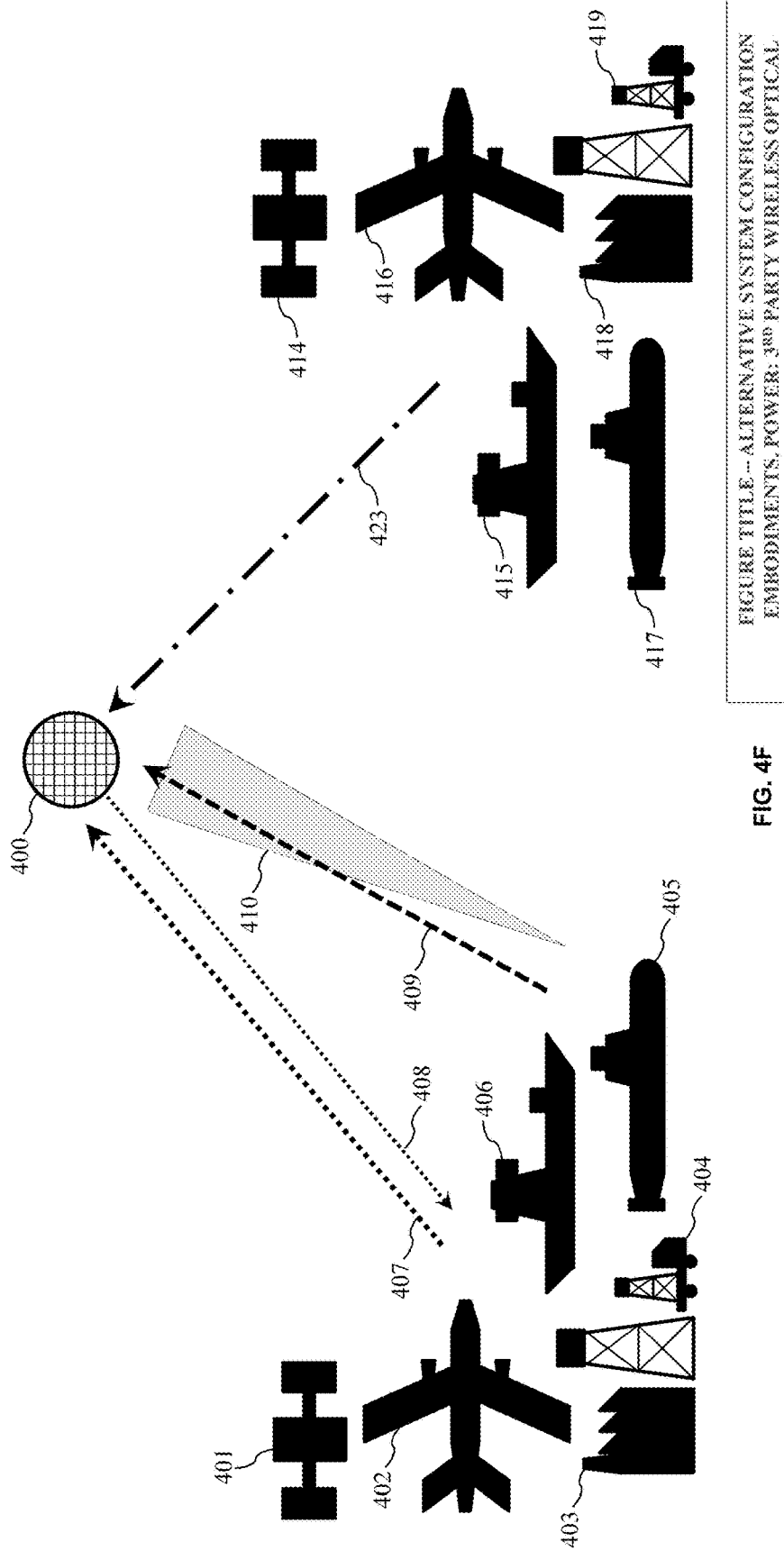
FIG. 4F shows an alternative system configuration where the system is provided external power wirelessly via the optical spectrum from a platform and is being inspected by a different platform from one or more operational domains using one or more frequencies within the radio and optical spectrum.

FIG. 4F shows an alternative system configuration where the system is provided external power wirelessly via the optical spectrum from a platform and is being inspected by a different platform from one or more operational domains using one or more frequencies within the radio and optical spectrum. Components shown in FIG. 4F are as follows: 423—External power provided to 400 in the optical spectrum via wireless link from 414, 415, 416, 417, 418, and 419.

Figure 4G:
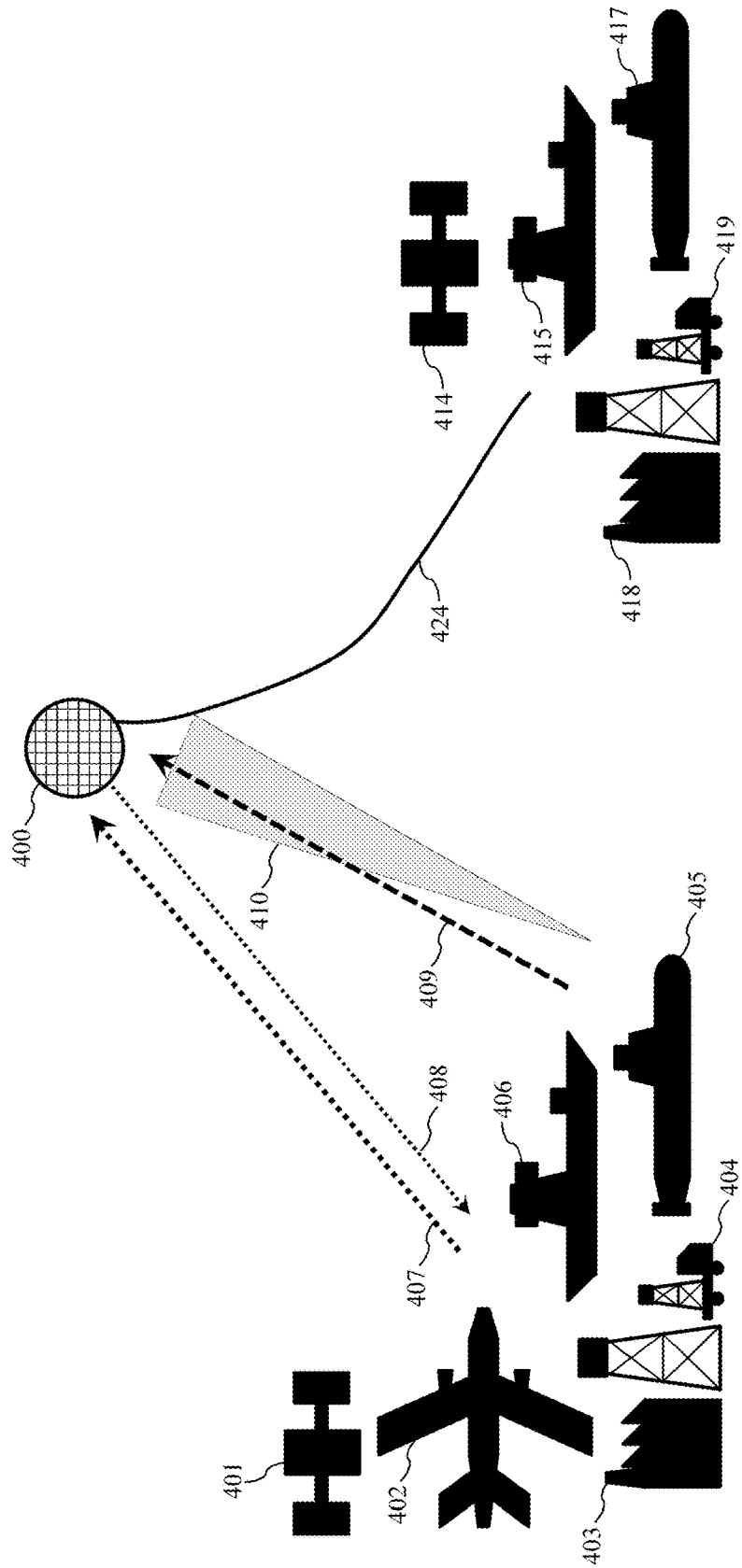
FIG. 4G shows an alternative system configuration where the system is provided external power via a wired tether from a platform and is being inspected by a different platform from one or more operational domains using one or more frequencies within the radio and optical spectrum.

FIG. 4G shows an alternative system configuration where the system is provided external power via a wired tether from a platform and is being inspected by a different platform from one or more operational domains using one or more frequencies within the radio and optical spectrum. Components shown in FIG. 4G are as follows: 424—External power provided to 400 via tether from 414, 415, 417, 418, and 419.

Figure 4H:
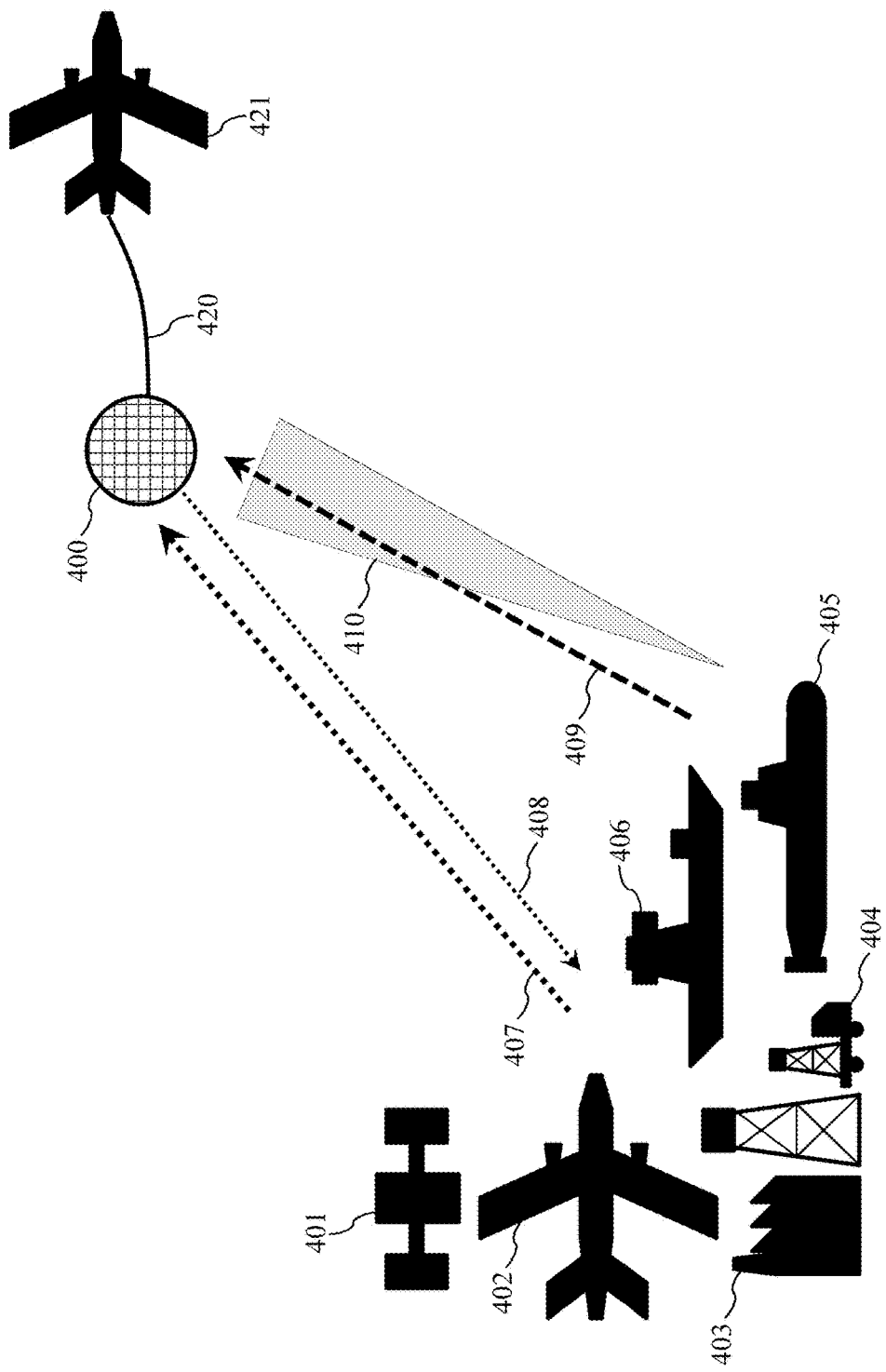
FIG. 4H shows an alternative system configuration where the system is controlled via a wired tether tow cable from an aerial platform and is being inspected by a different platform from one or more operational domains using one or more frequencies within the radio and optical spectrum.

FIG. 4H shows an alternative system configuration where the system is controlled via a wired tether tow cable from an aerial platform and is being inspected by a different platform from one or more operational domains using one or more frequencies within the radio and optical spectrum. Components shown in FIG. 4H are as follows: 420—External power provided to 400 via tether from 421.

Figure 5A:
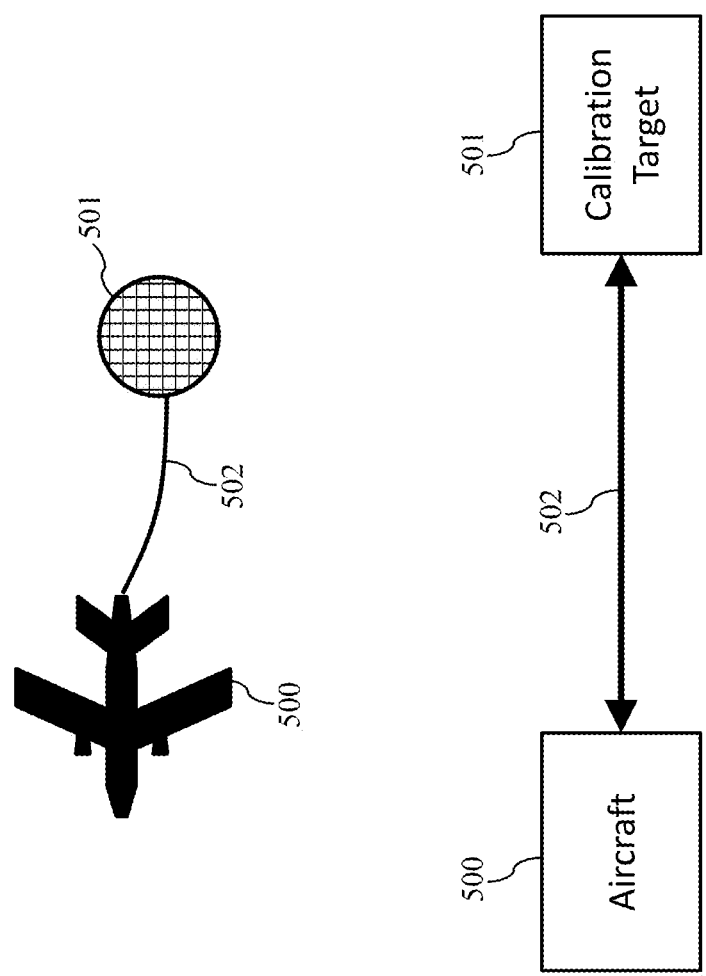
FIG. 5A shows the basic components of the alternative system configuration where the system is controlled via a wired tether tow cable from an aerial platform.

FIG. 5A shows the basic components of the alternative system configuration where the system is controlled via a wired tether tow cable from an aerial platform. Components shown in FIG. 5A are as follows: 500—Aerial platform towing the system, 501, via wired tether, 502.

Figure 5B:
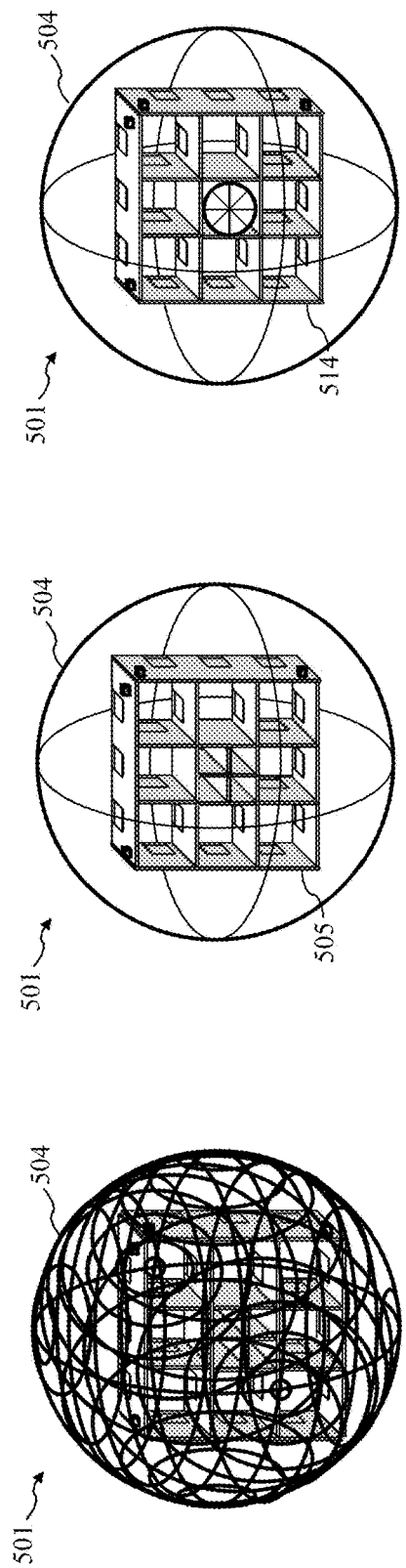
FIG. 5B shows a three dimensional view, three dimensional view structure cutaway wire view of the alternative system configuration where the system is controlled and powered via a wired tether tow cable from an aerial platform, and a three dimensional view structure cutaway wire view of the alternative system configuration where the system is controlled via a wired tether tow cable from an aerial platform while being powered by an on-board ram air turbine.

FIG. 5B shows a three dimensional view, three dimensional view structure cutaway wire view of the alternative system configuration where the system is controlled and powered via a wired tether tow cable from an aerial platform, and a three dimensional view structure cutaway wire view of the alternative system configuration where the system is controlled via a wired tether tow cable from an aerial platform while being powered by an on-board ram air turbine. Components shown in FIG. 5B are as follows: 505—Aerial platform, 500, towing the system, 501, via wired tether, 502, where 500 provides power and control instruction to 505 to ensure proper positioning of 501 during operation; 514—Aerial platform, 500, towing the system, 501, via wired tether, 502, where 500 provides control instruction to 514 to ensure proper positioning of 501 during operation. 514 is outfitted with a ram turbine engine to generate own 501 power.

Figure 5C:
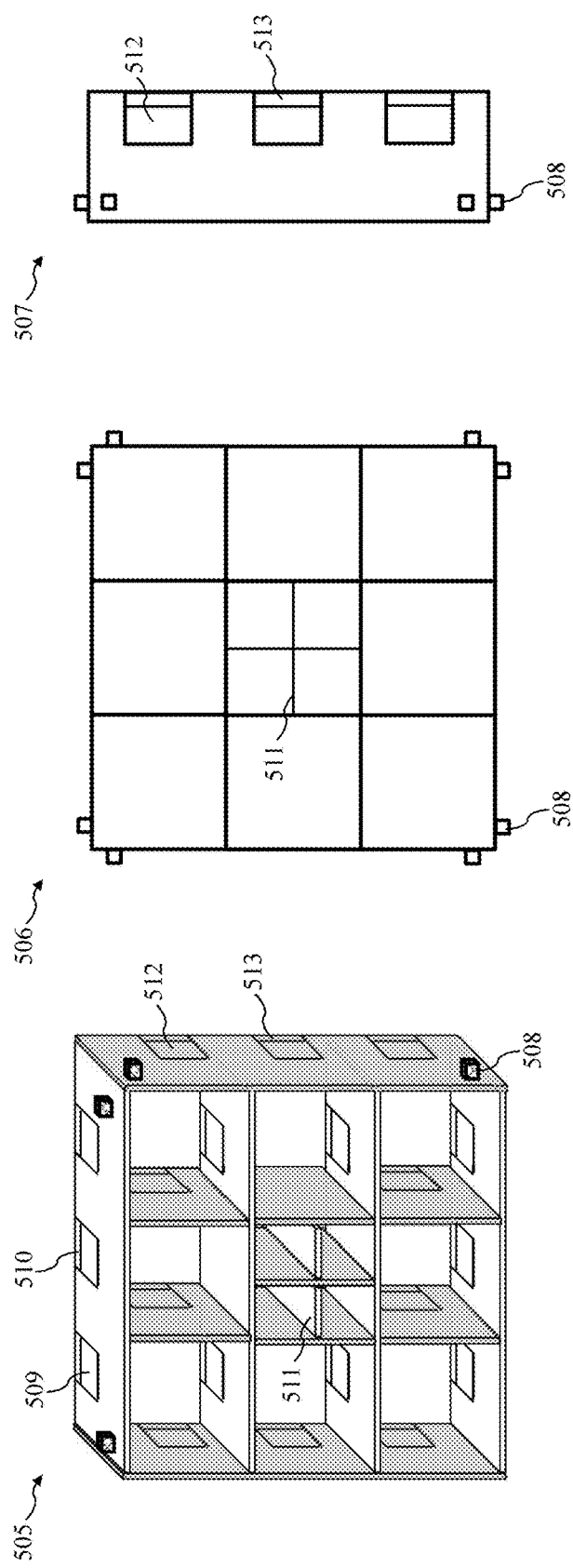
FIG. 5C shows a three dimensional view of the system controlled and powered via a wired tether tow cable from an aerial platform without the outer structure and its corresponding front and side profile views.

FIG. 5C shows a three dimensional view of the system controlled and powered via a wired tether tow cable from an aerial platform without the outer structure and its corresponding front, 506, and side profile, 507, views. Components shown in FIG. 5C are as follows: 509—Ailerons within 505, 10 total for flight control; 510—Aileron tabs attached to each 509 for flight control; 511—Air flow structure within 505 to provide aerodynamic stability; 512—Rudders within 505, 10 total for flight control; 513—Rudder tabs attached to each 512 for flight control; 508—505 sensor units for flight dynamic and control feedback to assess stability and positioning.

Figure 5D:
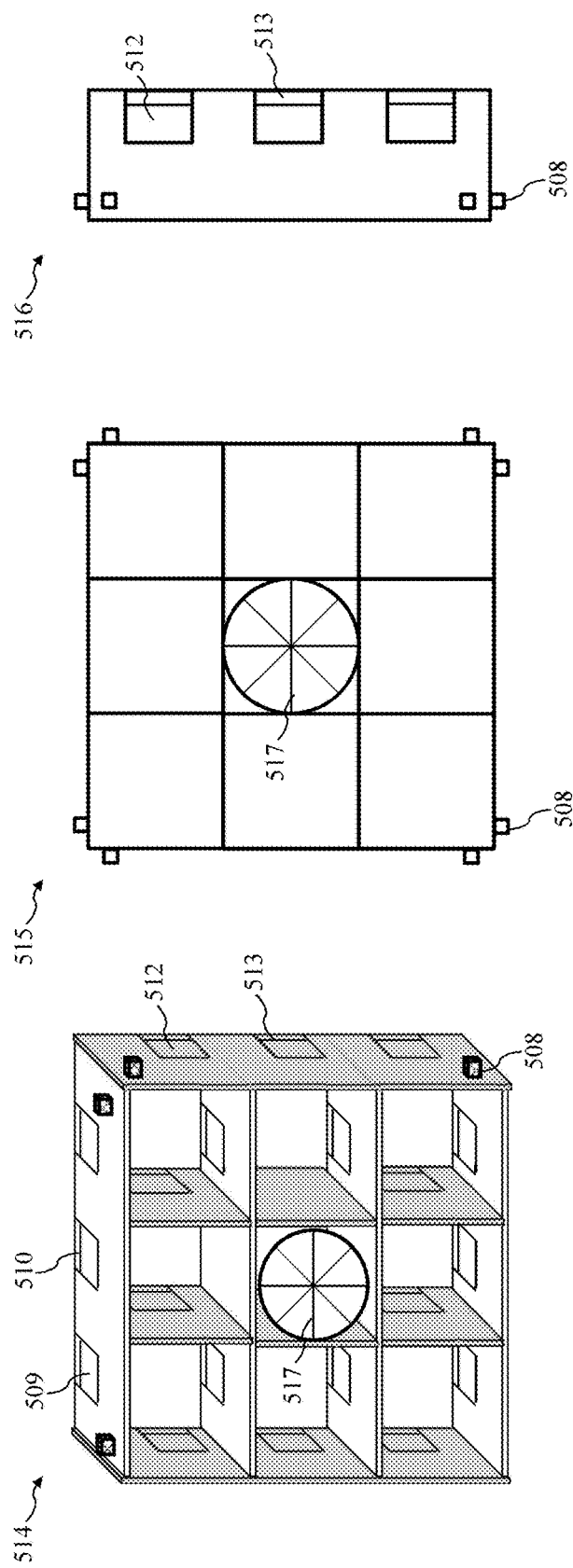
FIG. 5D shows a three dimensional view of the system controlled via a wired tether tow cable from an aerial platform while being powered by an on-board ram air turbine without the outer structure and its corresponding front and side profile views.

FIG. 5D shows a three dimensional view of the system controlled via a wired tether tow cable from an aerial platform while being powered by an on-board ram air turbine without the outer structure and its corresponding front, 515, and side profile, 516, views. Components shown in FIG. 5D are as follows: 517—Ram turbine engine structure to generate onboard power need to power 501.

Figure 5E:
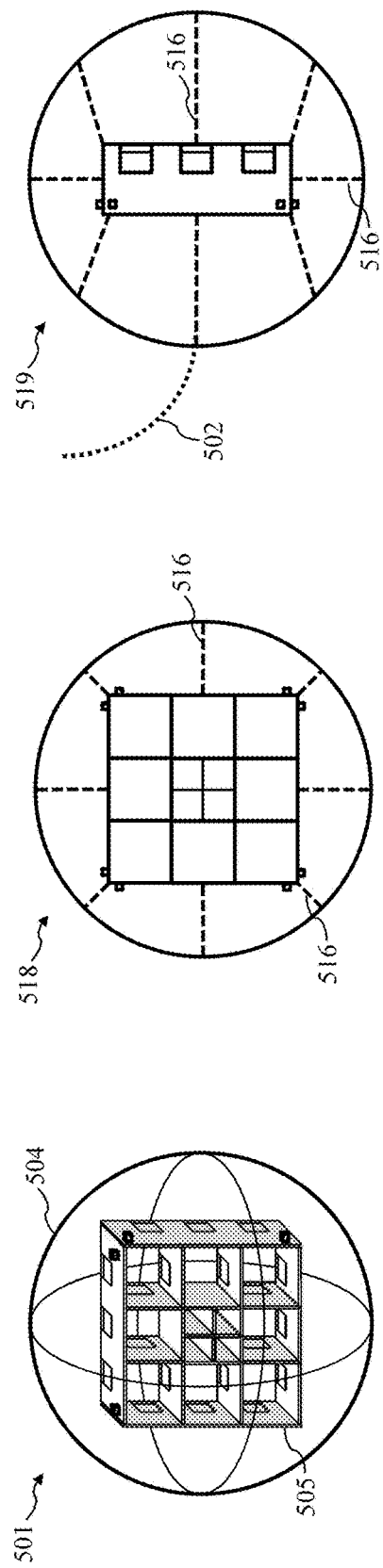
FIG. 5E shows a three dimensional view of the system controlled and powered via a wired tether tow cable from an aerial platform and its corresponding front and side profile views of the outer structure attachment points.

FIG. 5E shows a three dimensional view of the system controlled and powered via a wired tether tow cable from an aerial platform and its corresponding front, 518, and side profile, 519, views of the outer structure attachment points. Components shown in FIG. 5E are as follows: 516—Structural mounting points to attached 505 to 504.

Figure 5F:
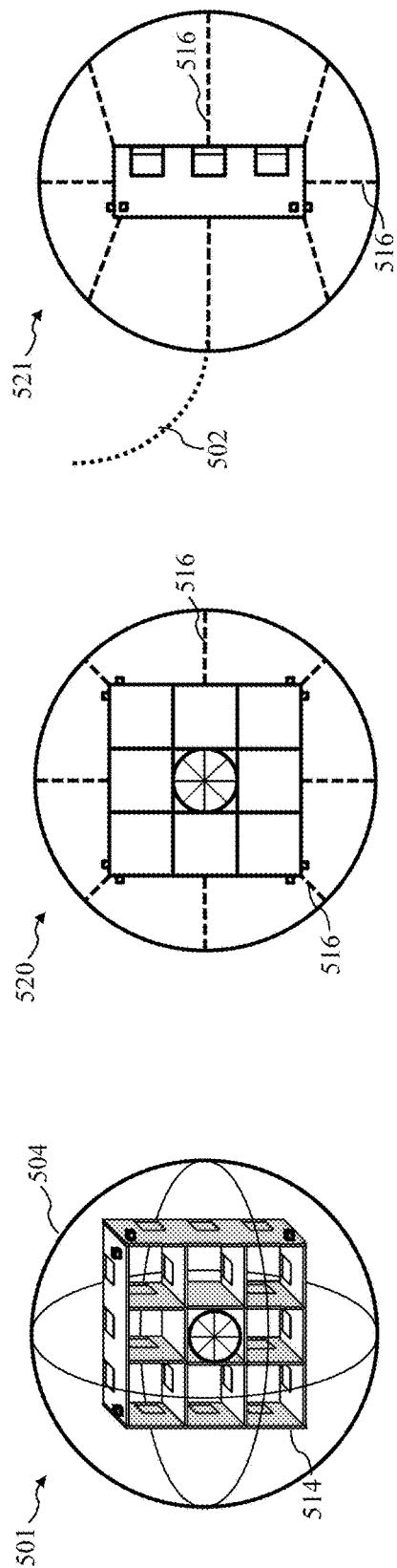
FIG. 5F shows a three dimensional view of the system controlled via a wired tether tow cable from an aerial platform while being powered by an on-board ram air turbine and its corresponding front and side profile views of the outer structure attachment points.

FIG. 5F shows a three dimensional view of the system controlled via a wired tether tow cable from an aerial platform while being powered by an on-board ram air turbine and its corresponding front, 520, and side profile, 521, views of the outer structure attachment points. Components shown in FIG. 5F are as follows: 516—Structural mounting points to attached 514 to 504.

Figure 5G:
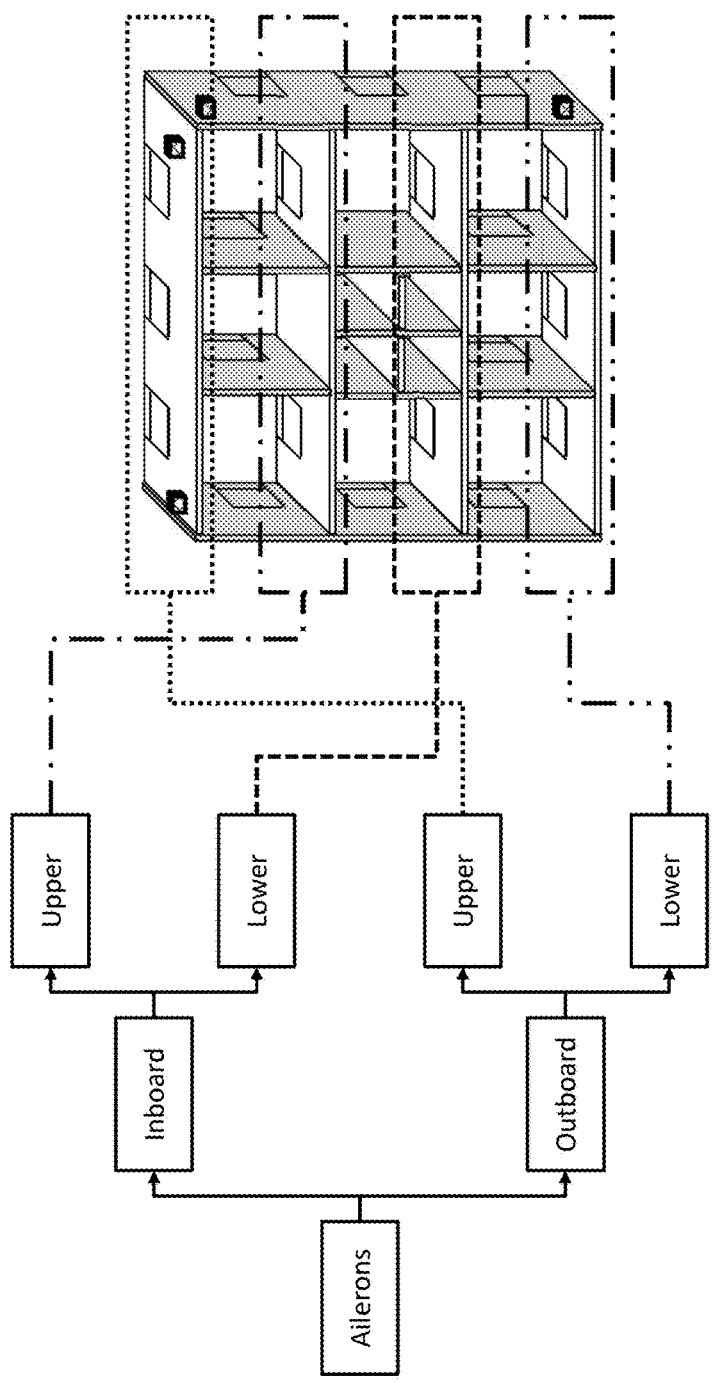
FIG. 5G shows a three dimensional view of the system without the outer structure, independent of on-board or provided power, detailing the vertical aileron flight control surfaces.

FIG. 5G shows a three dimensional view of the system without the outer structure, independent of on-board or provided power, detailing the vertical aileron flight control surfaces. This serves as the aileron vertical location naming convention.

Figure 5H:
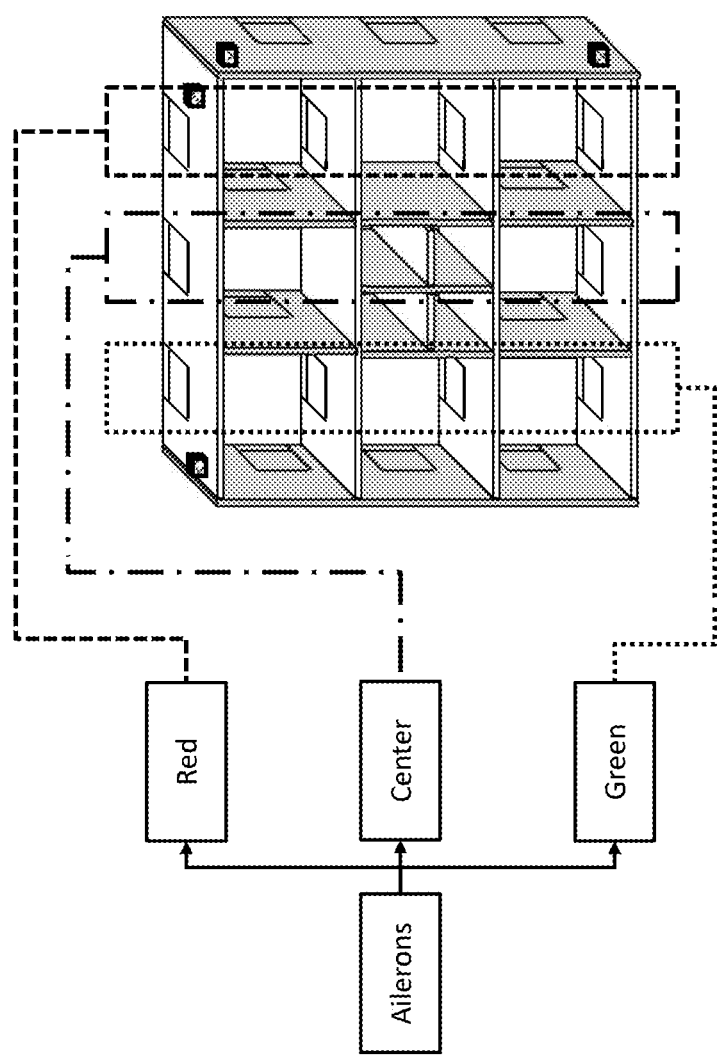
FIG. 5H shows a three dimensional view of the system without the outer structure, independent of on-board or provided power, detailing the horizontal aileron flight control surfaces.

FIG. 5H shows a three dimensional view of the system without the outer structure, independent of on-board or provided power, detailing the horizontal aileron flight control surfaces. This serves as the aileron horizontal location naming convention.

Figure 5I:
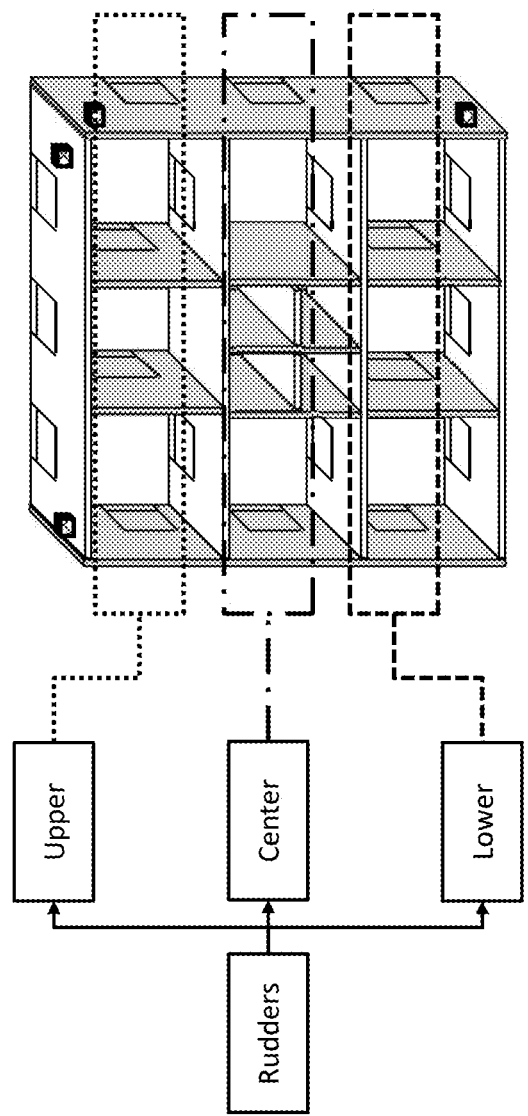
FIG. 5I shows a three dimensional view of the system without the outer structure, independent of on-board or provided power, detailing the vertical rudder flight control surfaces.

FIG. 5I shows a three dimensional view of the system without the outer structure, independent of on-board or provided power, detailing the vertical rudder flight control surfaces. This serves as the rudder vertical location naming convention.

Figure 5J:
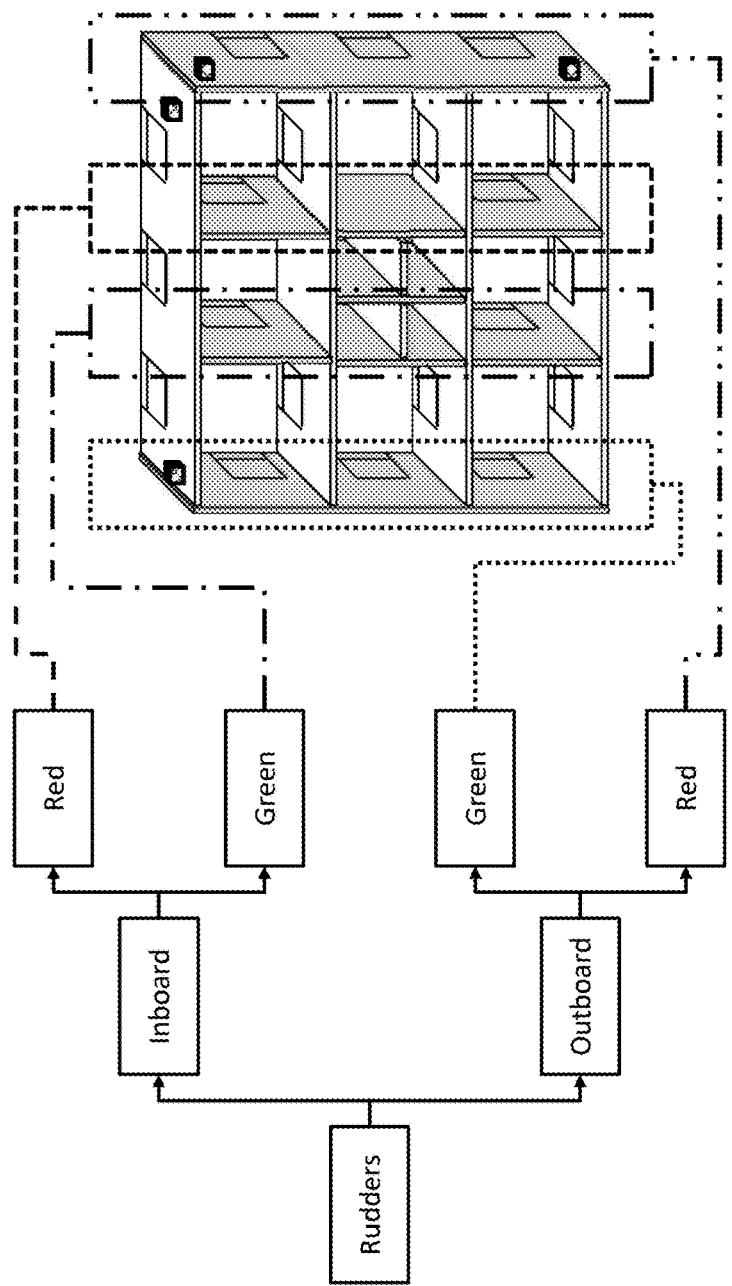
FIG. 5J shows a three dimensional view of the system without the outer structure, independent of on-board or provided power, detailing the horizontal rudder flight control surfaces.

FIG. 5J shows a three dimensional view of the system without the outer structure, independent of on-board or provided power, detailing the horizontal rudder flight control surfaces. This serves as the rudder horizontal location naming convention.

Figure 5K:
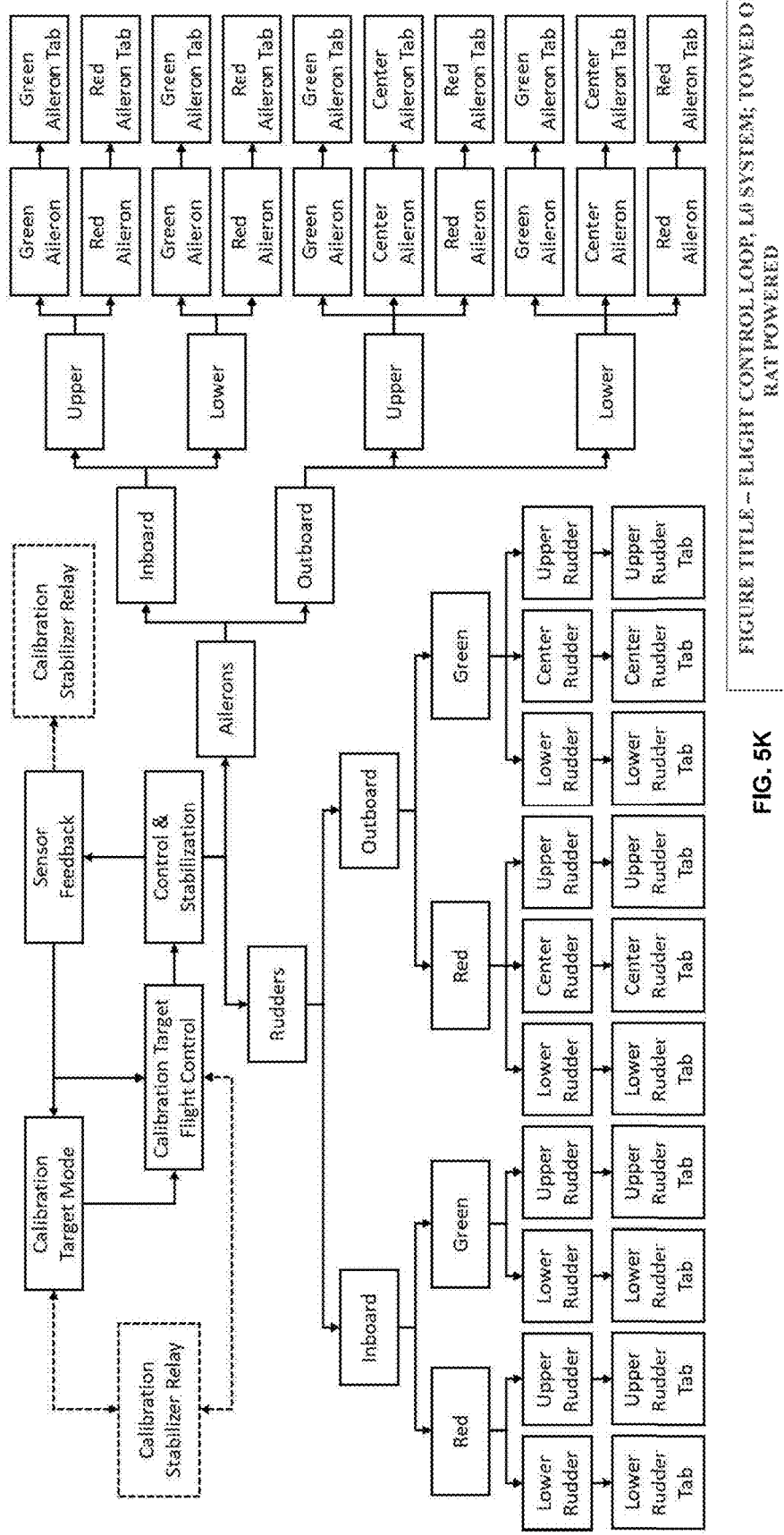
FIG. 5K shows the system flight control loop and flight control surface communication data flows.

FIG. 5K shows the system flight control loop and flight control surface communication data flows. This serves as the full naming list of all the dynamic flight control surfaces contained within 505 and 514.

Figure 5L:
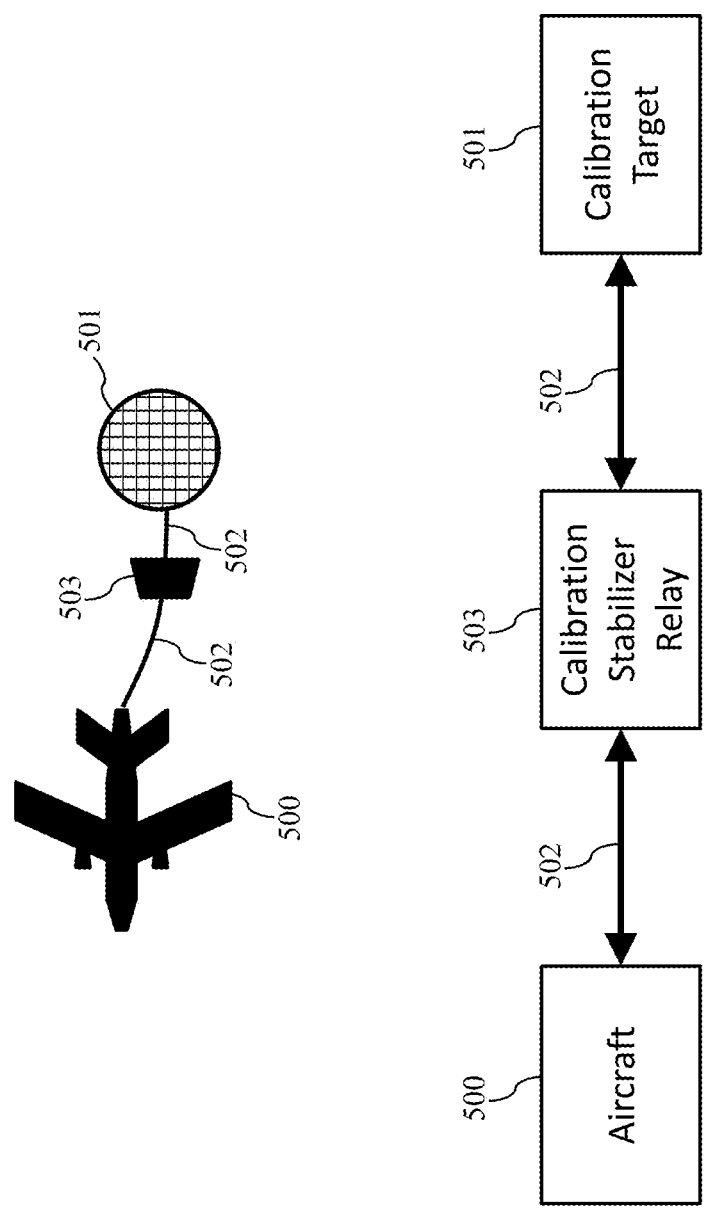

FIG. 5L shows the basic components of the alternative system configuration where the system, 501, is controlled via a wired tether tow cable, 502, from an aerial platform, 500, with a calibration stabilizer relay, 503, in-between. 503 offers additional flight dynamic control and stabilization to 501 to ensure aerodynamic affects and interactions from 500 do not prevent 501 from successfully completing its current mission task.

Figure 5M:
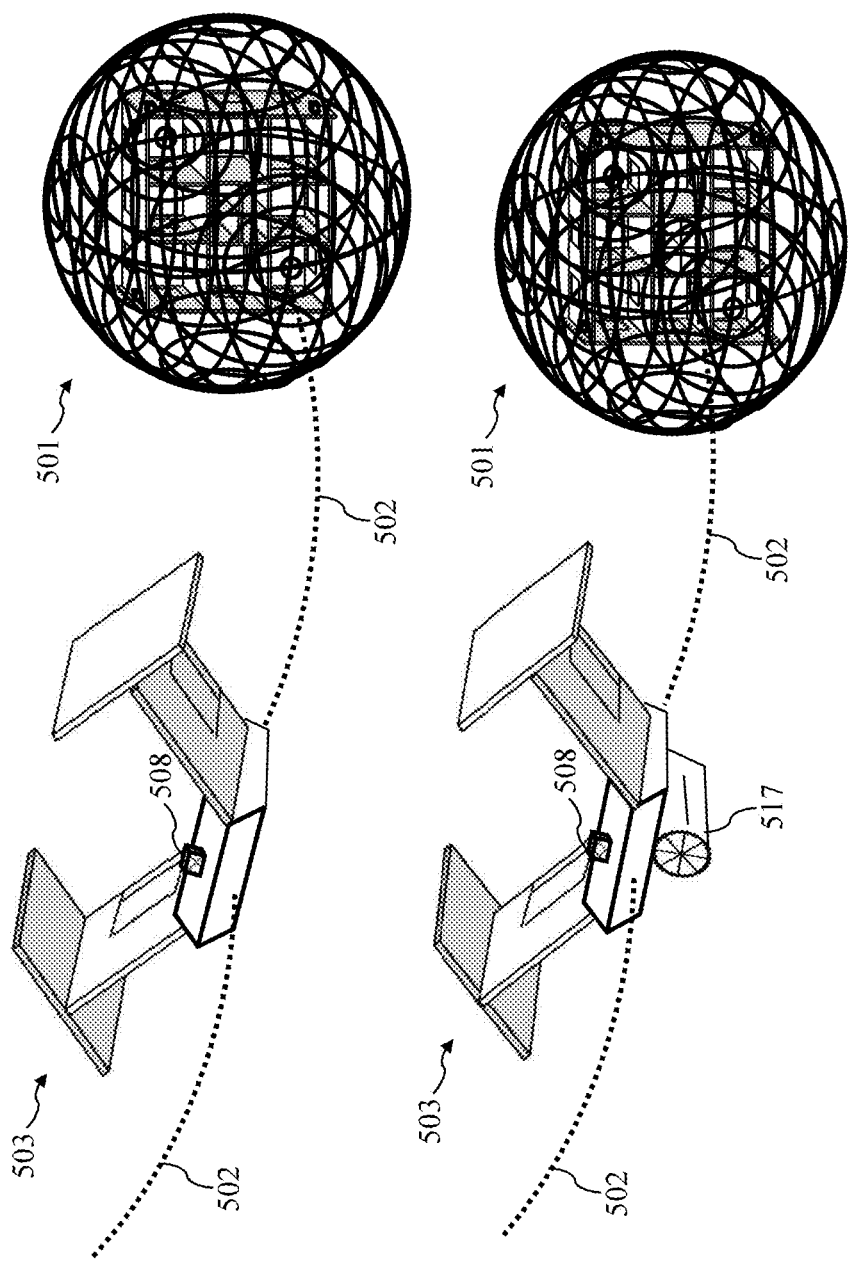
FIG. 5M shows the basic components of the calibration stabilizer relay with an alternative configuration where the relay provides its own power via an on-board ram air turbine.

FIG. 5M shows the basic components of the calibration stabilizer relay, 503, with an alternative configuration where the relay provides its own power via an on-board ram air turbine, 517. 503 also contains a sensor unit for flight dynamic and control feedback to assess stability and positioning, 508.

Figure 5N:
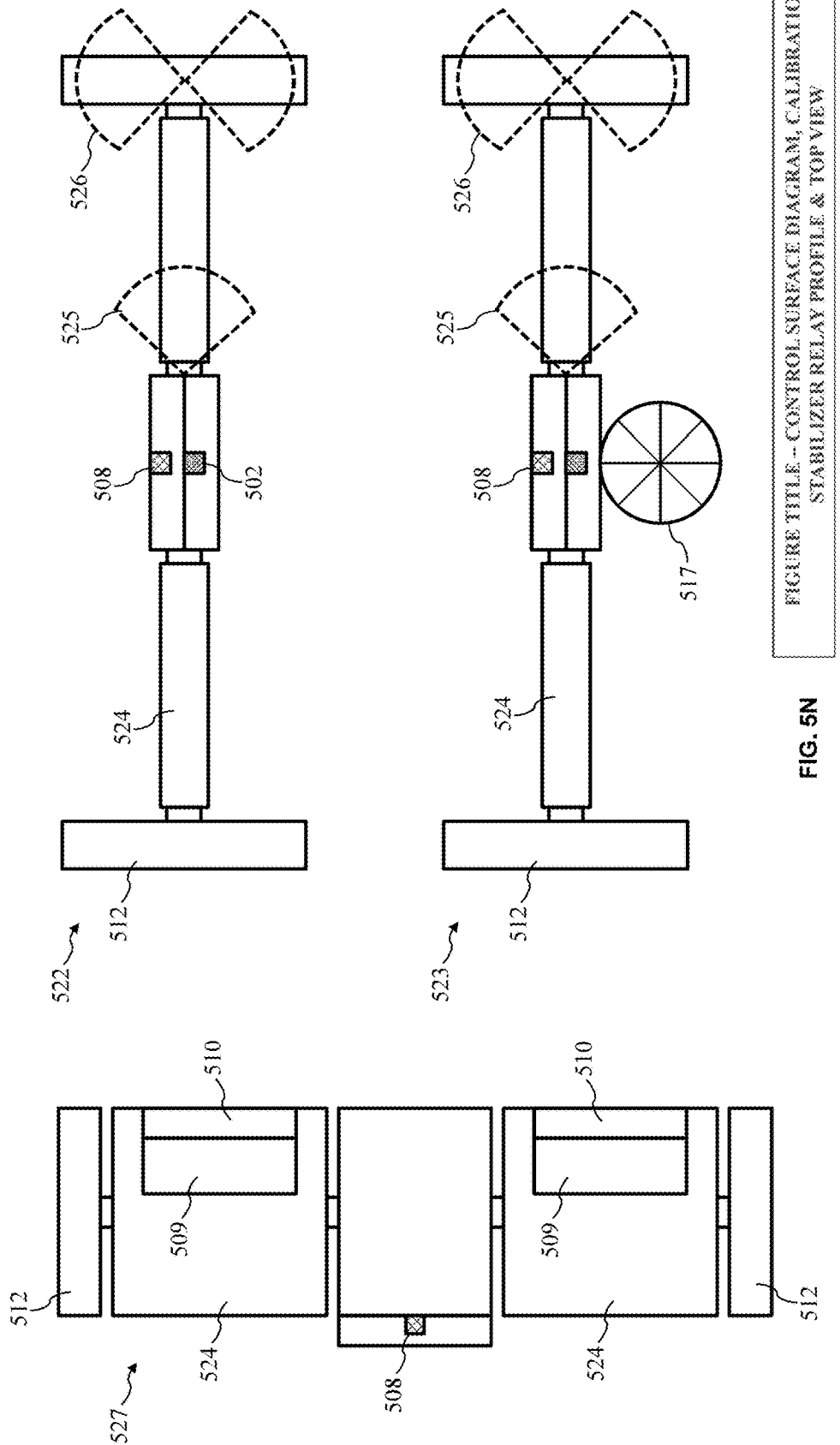
FIG. 5N shows the basic components of the calibration stabilizer relay, flight control surfaces, and degrees of freedom within the major flight control surfaces.
Figure 50:
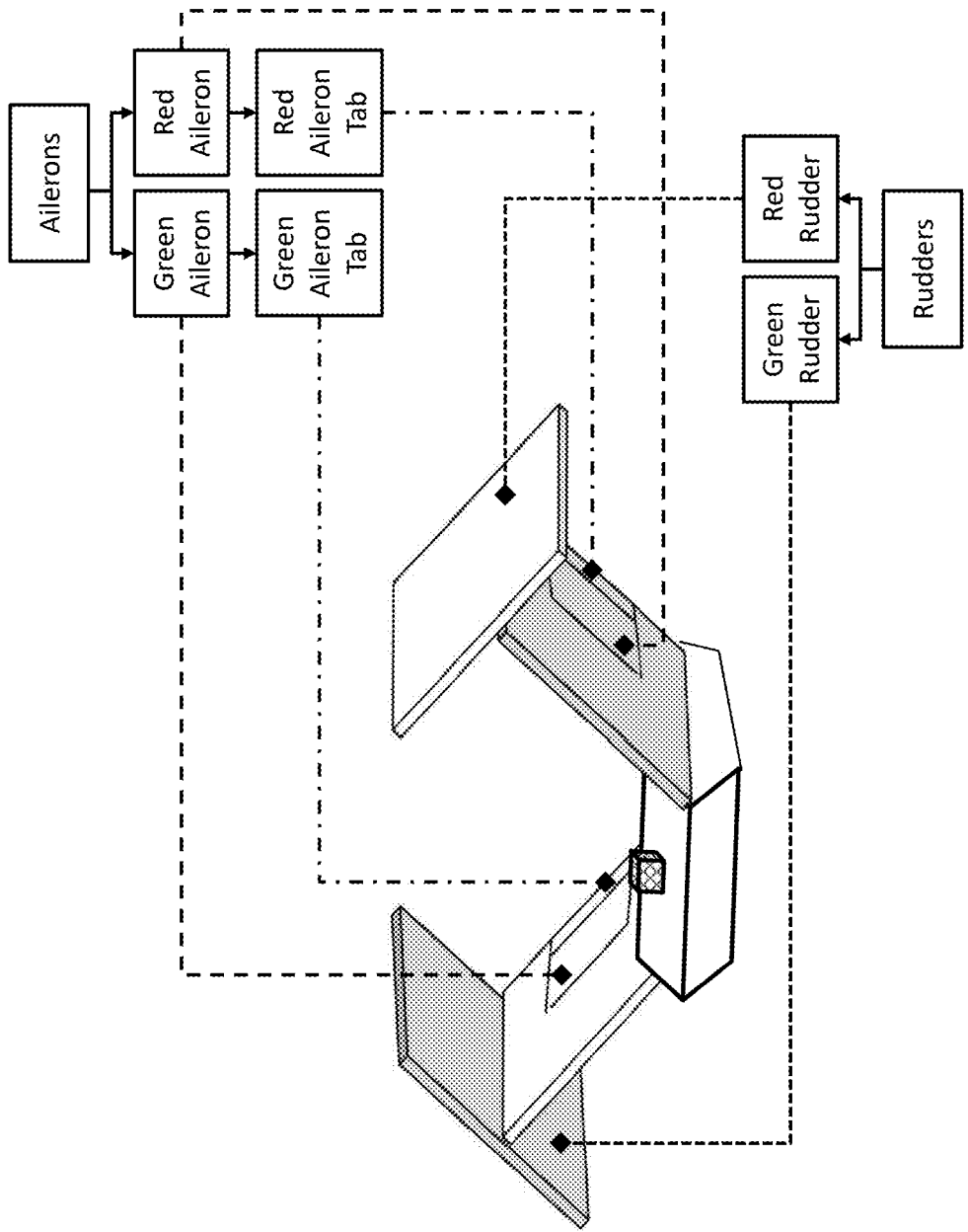

FIG. 5N shows the basic components of the calibration stabilizer relay, flight control surfaces, and degrees of freedom within the major flight control surfaces. Components shown in FIG. 5N are as follows: 527—Top down view of 503; 509—Ailerons with aileron tabs, 510; 524—Wings of 503; 512—Rudders of 503; 522—Side profile view of 503 showing 502 connection point with 524 degrees of freedom for the wings, 525, and 512 degrees of freedom for the rudders, 526; 523—Side profile view of 503 with an alternate configuration where the relay provides its own power via an on-board ram air turbine, 517.

FIG. 5O shows the basic components of the calibration stabilizer relay's flight control surfaces, independent of on-board or provided power, detailing the aileron and rudder flight control surfaces. This serves as the rudder and aileron horizontal naming convention.

Figure 5P:
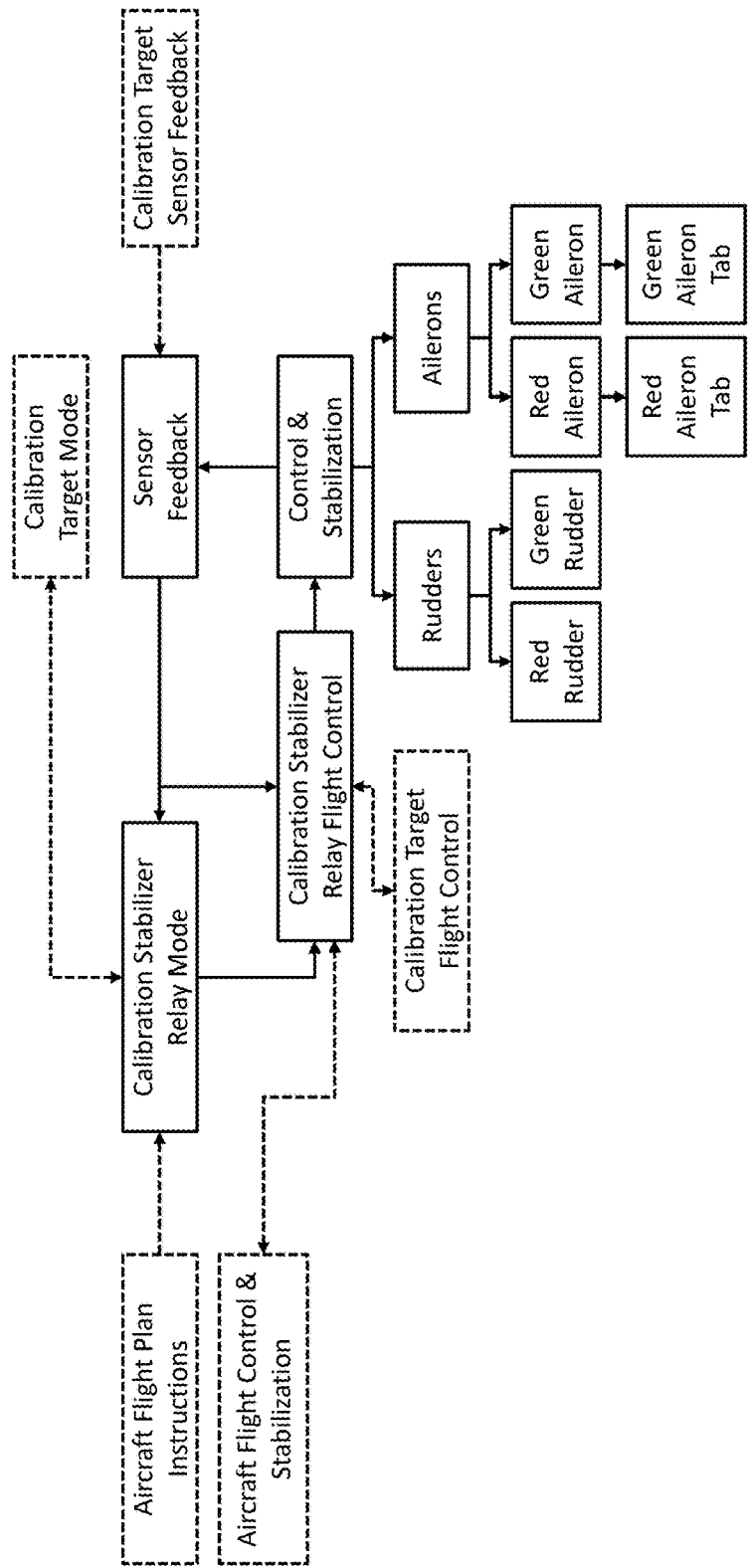
FIG. 5P shows the system flight control loop and flight control surface communication data flows of the calibration stabilizer relay.

FIG. 5P shows the system flight control loop and flight control surface communication data flows of the calibration stabilizer relay, 503.

Figure 6A:
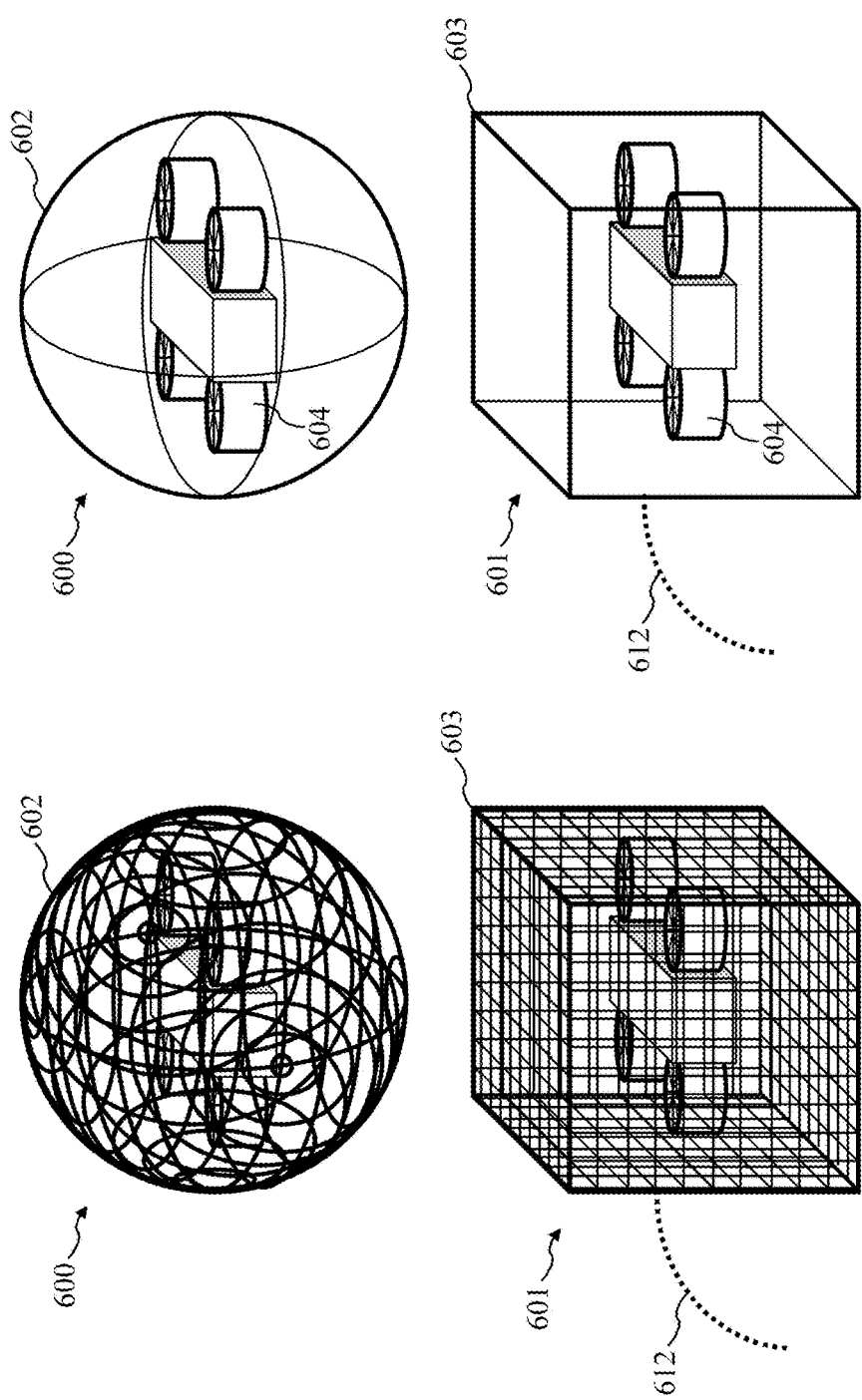
FIG. 6A shows a three dimensional view and three dimensional view structure cutaway wire view of an alternative system configuration where the system is controlled and powered by on-board generation, wire tether, or wireless power transfer means.

FIG. 6A shows a three dimensional view and cutaway wire frame view of an alternative system configuration where the system is controlled and powered by on-board generation, wire tether, or wireless power transfer means. Components shown in FIG. 6A are as follows: 600—Three dimensional and cutaway wire frame cutaway views of the system in a spherical mesh structure, 602; 601—Three dimensional and cutaway wire frame cutaway views of the system in a cubic mesh structure, 603; Both 600 and 601 are shown with an internal propulsion system, like a quad copter, 604; 601 shows the system being provided communication and power externally via a wire tether, 612, whereas 600 is powered internally by on-board generation or wireless power transfer means.

Figure 6B:
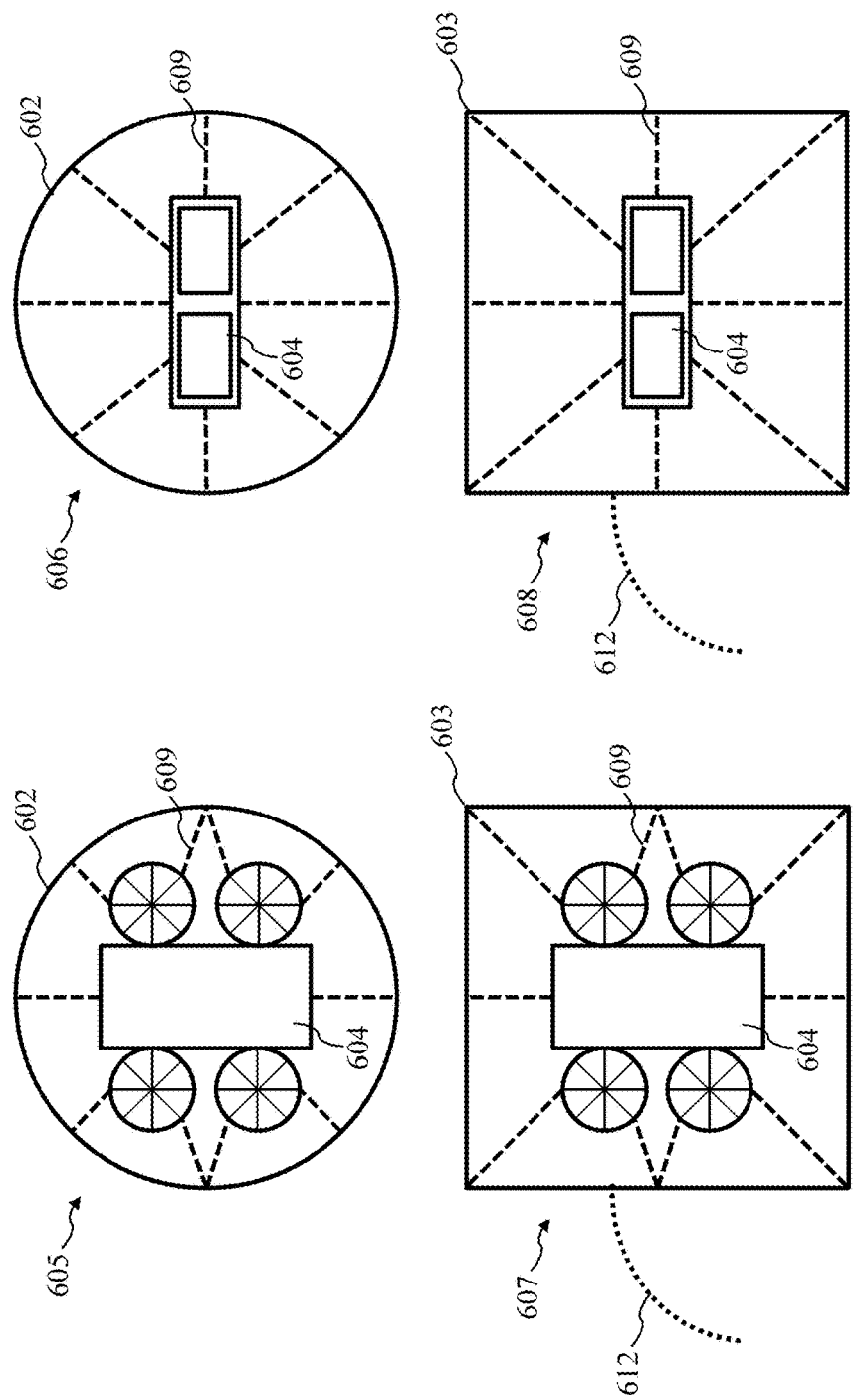
FIG. 6B shows a two dimensional view of the system controlled and powered by on-board generation, wire tether, or wireless power transfer means and its corresponding front and side profile views of the outer structure attachment points.

FIG. 6B shows a two dimensional view of the system controlled and powered by on-board generation, wire tether, or wireless power transfer means and its corresponding front and side profile views of the outer structure attachment points. Components shown in FIG. 6B are as follows: 605—Top down view of 600 showing internal control and propulsion system, 604, and connection points, 609, to the spherical mesh structure, 602; 606—Side profile view of 600 showing internal control and propulsion system, 604, and connection points, 609, to the spherical mesh structure, 602; 605 and 606 are powered internally by on-board generation or wireless power transfer means; 607—Top down view of 601 showing internal control and propulsion system, 604, and connection points, 609, to the cubic mesh structure, 603; 608—Side profile view of 601 showing internal control and propulsion system, 604, and connection points, 609, to the cubic mesh structure, 603; 607 and 608 are being provided communication and power externally via a wire tether, 612.

Figure 6C:
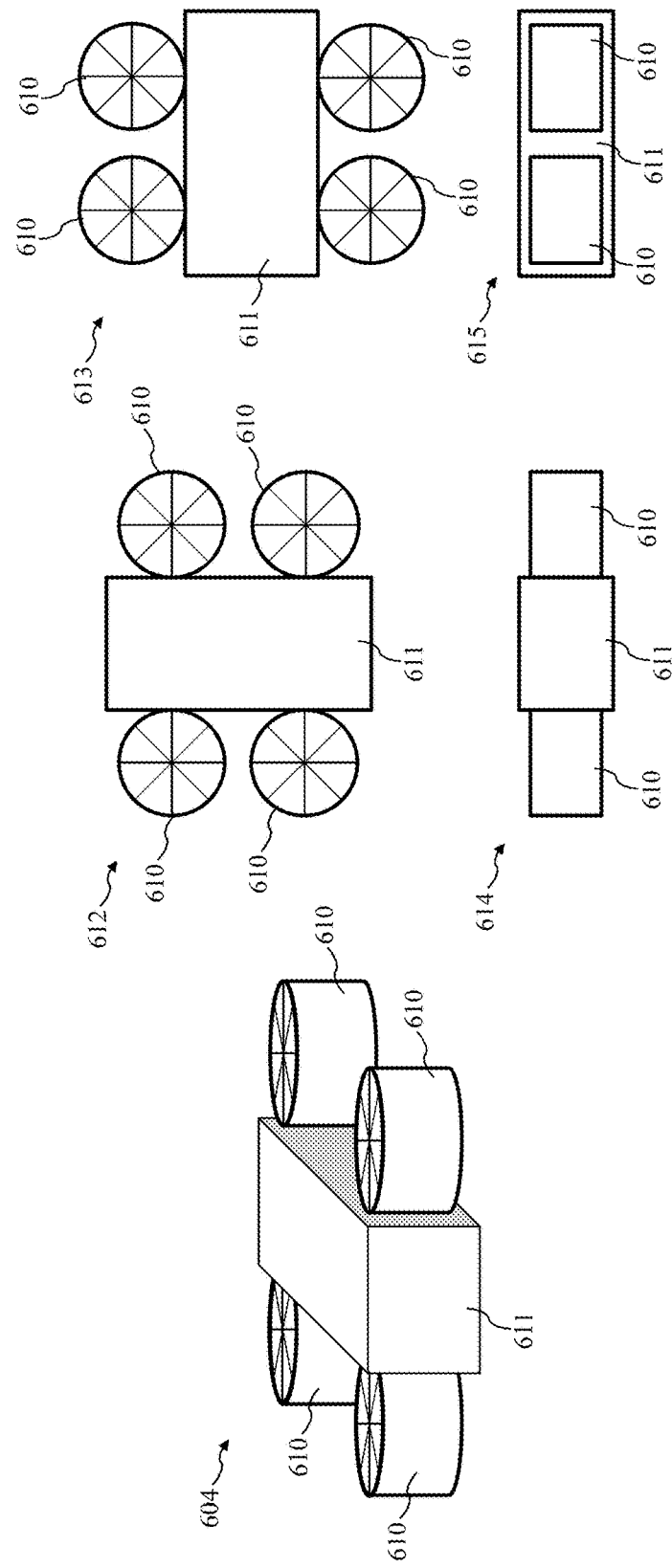
FIG. 6C shows the basic components of the system controlled and powered by on-board generation, wire tether, or wireless power transfer means.

FIG. 6C shows the basic components of the internal control system, 604, controlled and powered by on-board generation, wire tether, or wireless power transfer means. Components shown in FIG. 6C are as follows: 612 and 613—Top down views of the internal control system showing the main body of the system, 611, which contains the processing functions, flight logic control, and stored mission payloads; 610 are each of the propulsion units attached to the body of 611 allowing for individual motion control and stabilization to include vertical take-off and landing capabilities like a quad copter; 614 and 615—Side profile and Side front views of 604.

Figure 7A:
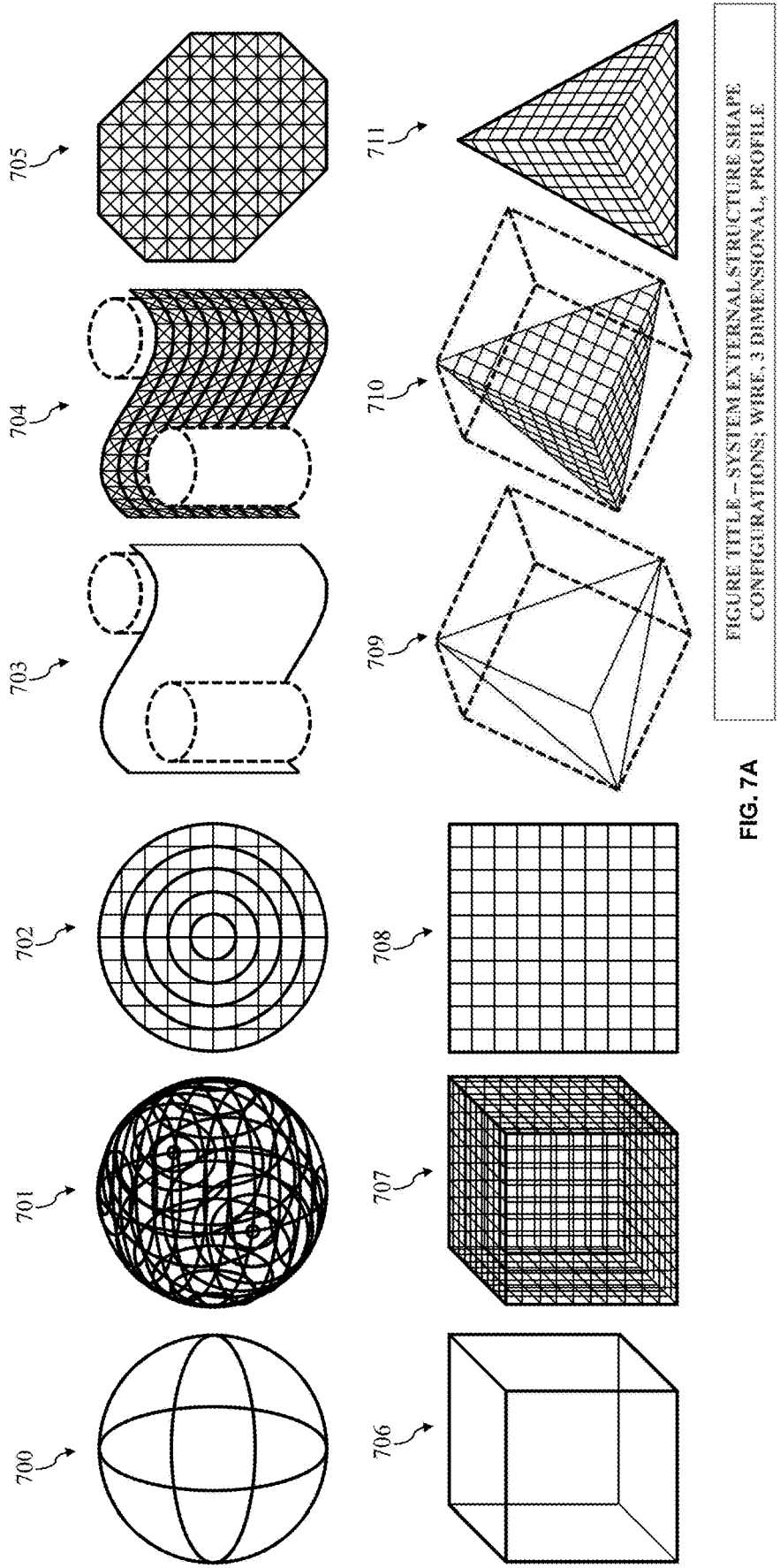
FIG. 7A shows the basic configurations of the external structure of the system to include a wire frame, side profile, and three dimensional views.

FIG. 7A shows the basic configurations of the external structure of the system to include a wire frame, side profile, and three dimensional views. Components shown in FIG. 7A are as follows: 700—Three dimensional wire frame view of a spherical external structure; 701—Three dimensional full mesh view of a spherical external structure; 702—Side profile wire frame view of a spherical external structure; 703—Three dimensional wire frame view of a dynamic external structure; 704—Three dimensional full mesh view of a dynamic external structure; 705—Side profile wire frame view of a dynamic external structure; 706—Three dimensional wire frame view of a cubic external structure; 707—Three dimensional full mesh view of a cubic external structure; 708—Side profile wire frame view of a cubic external structure; 709—Three dimensional wire frame view of a corner reflector external structure; 710—Three dimensional full mesh view of a corner reflector external structure; 711—Side profile wire frame view of a corner reflector external structure.

Figure 7B:
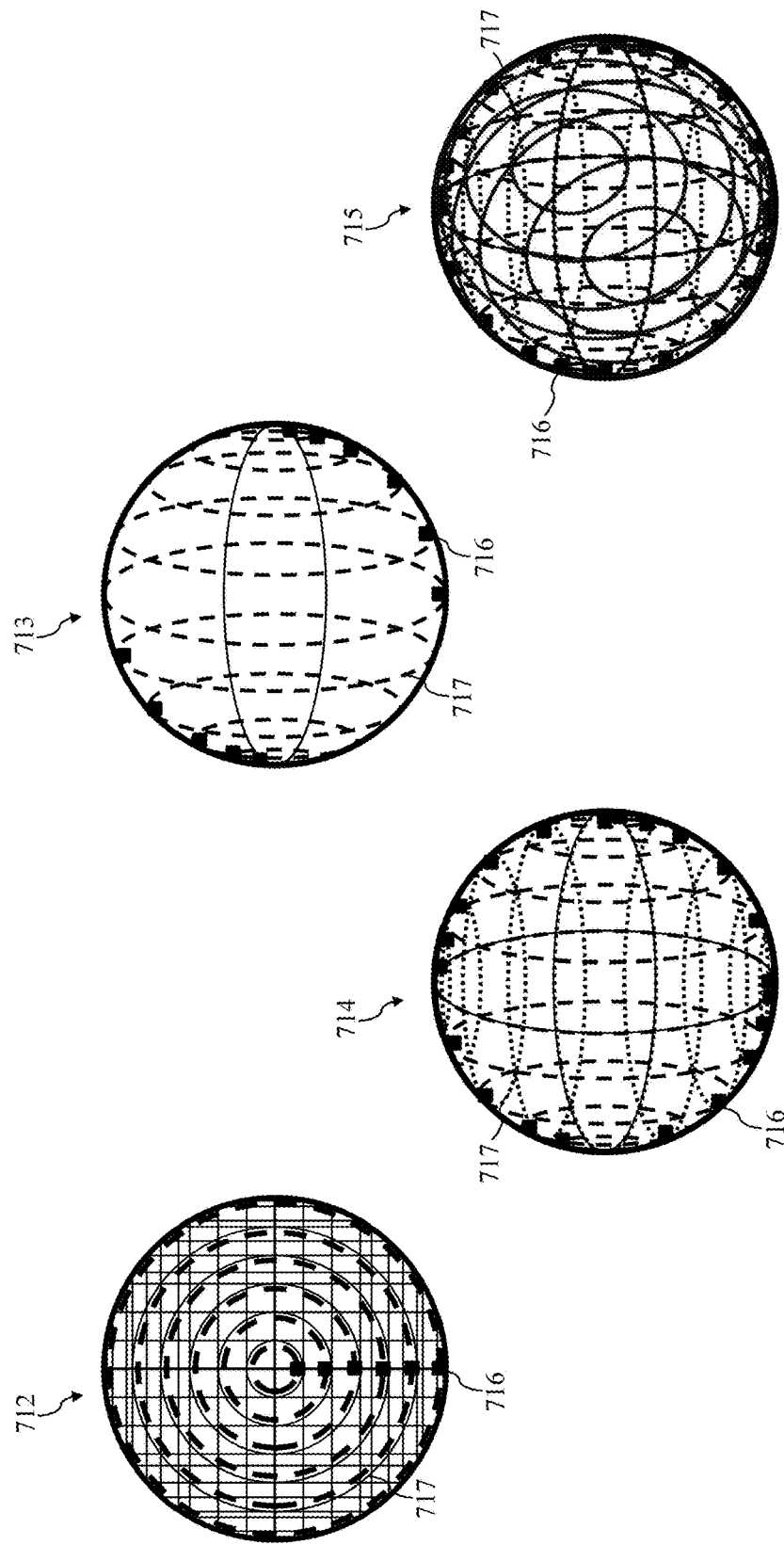
FIG. 7B shows the side profile, wire frame and three dimensional views of the system's integrated communication antennas in a static spherical structure configuration.

FIG. 7B shows the side profile, wire frame and three dimensional views of the system's integrated communication antennas in a static spherical structure configuration. Components shown in FIG. 7B are as follows: 712—Side profile view of 701 showing the various integrated communication antennas, 717, starting and terminating at the antenna control points, 716; 713—Three dimensional wire frame view of 701 showing the various integrated communication antennas in the vertical direction, 717, starting and terminating at the antenna control points, 716; 714—Three dimensional wire frame view of 701 showing the various integrated communication antennas in the vertical and horizontal directions, 717, starting and terminating at the antenna control points, 716; 715—Three dimensional full mesh view of 701 showing the various integrated communication antennas in the vertical and horizontal directions, 717, starting and terminating at the antenna control points, 716.

Figure 7C:
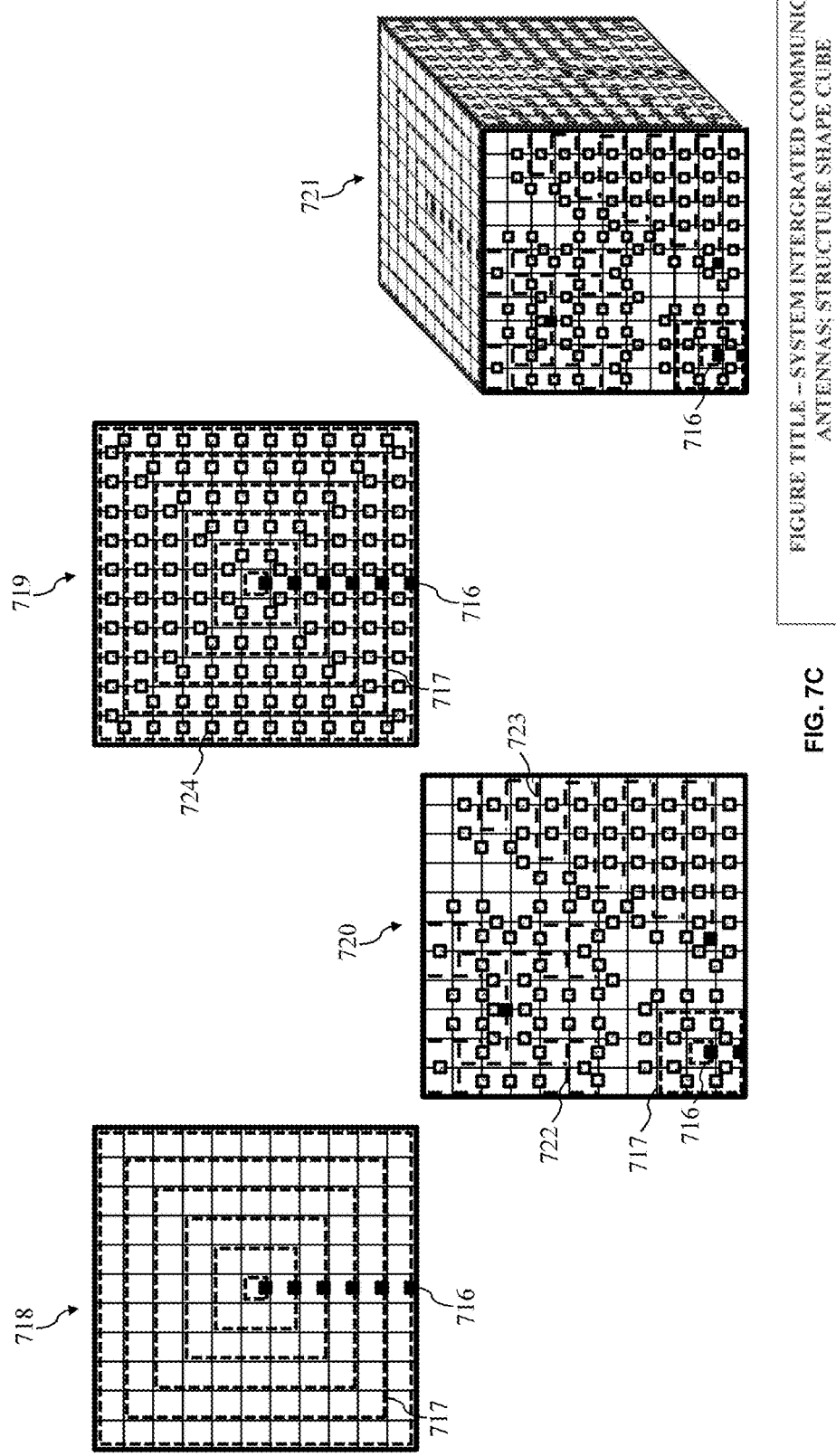
FIG. 7C shows the side profile, wire frame and three dimensional views of the system's integrated communication antennas in a static cubic structure configuration.

FIG. 7C shows the side profile, wire frame and three dimensional views of the system's integrated communication antennas in a static cubic structure configuration. Components shown in FIG. 7C are as follows: 718—Side profile view of 707 showing the various integrated communication antennas, 717, starting and terminating at the antenna control points, 716; 719—Side profile view of 707 showing the various configurable integrated communication antennas due to electrical conducting switches, 724, allowing for different antenna shapes and lengths to be created; 720—Side profile view of 707 showing the various configurable integrated communication antennas shapes such as a fractal antenna, 722, a loop antenna, 717, and an array antenna, 723; 721—Three dimensional full mesh view of 707 showing the various integrated communication antennas.

Figure 7D:
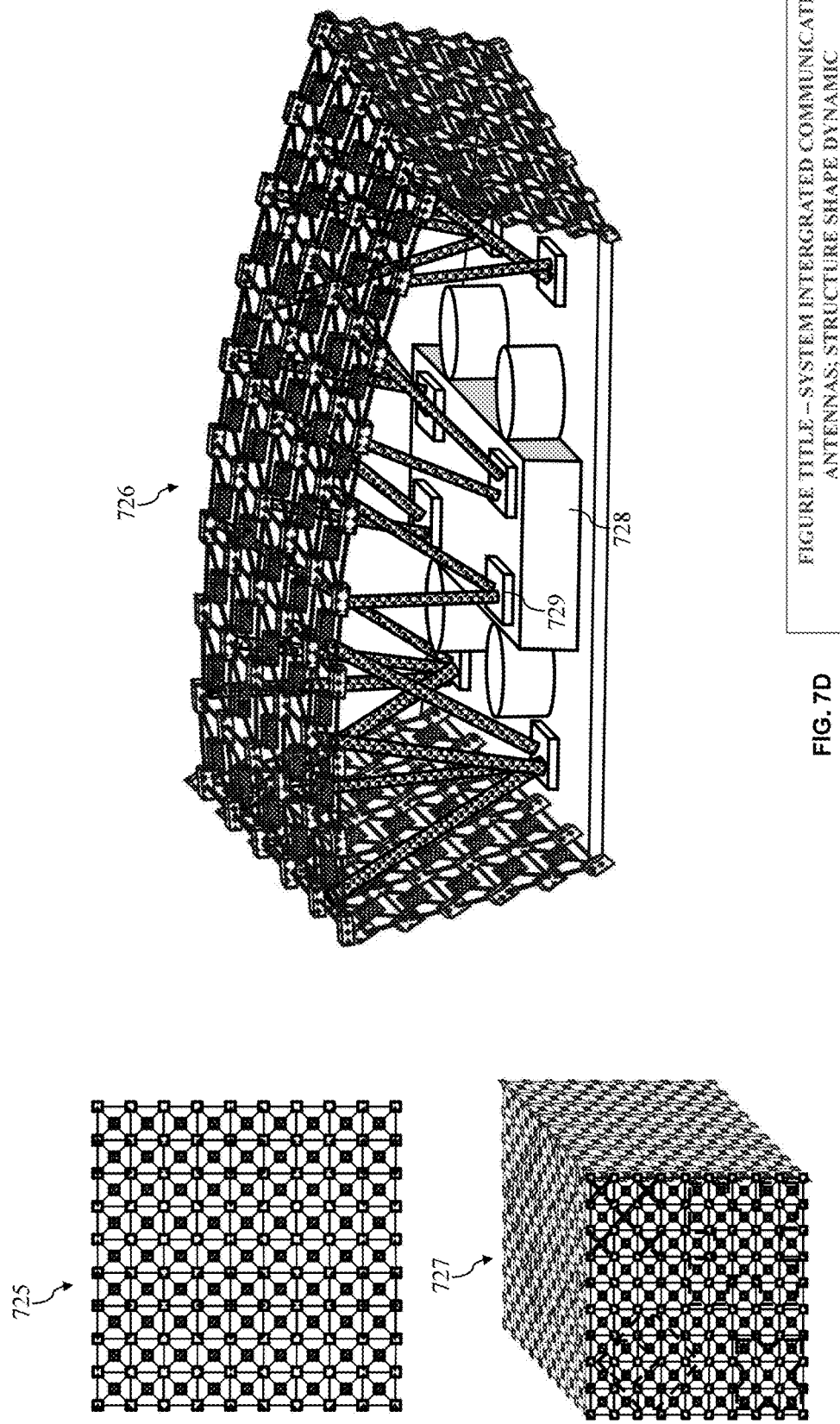
FIG. 7D shows the side profile, wire frame and three dimensional cutaway views of the system in a dynamic structure configuration.

FIG. 7D shows the side profile, wire frame and three dimensional cutaway views of the system in a dynamic structure configuration. Components shown in FIG. 7D are as follows: 725—Side profile view of 704 made up of a flexible, programmable mesh; 727—Three dimensional view of 704 in a cubic configuration; 726—Three dimensional cutaway view of a system made up of 704 showing the system's internal control and propulsion unit, 728, and its external structure control units, 729, responsible for changing the external structures shape and antenna patterns.

Figure 7E:
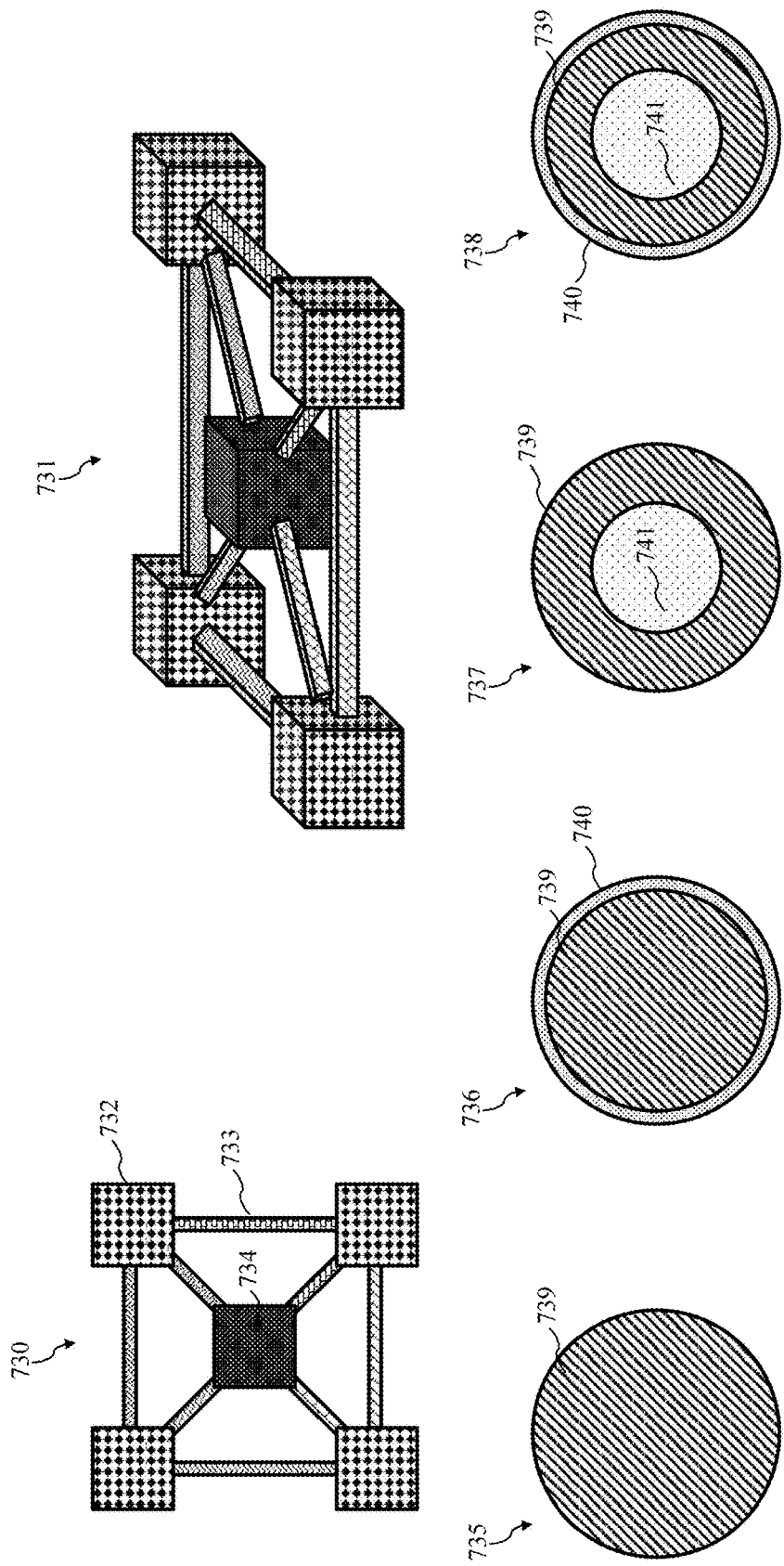
FIG. 7E shows the top down, three dimensional, and wire cutaway views of a dynamic structure wire cell.

FIG. 7E shows the top down, three dimensional, and wire cutaway views of a dynamic structure wire cell. Components shown in FIG. 7E are as follows: 730—Top down view of a wire cell configuration, multiple of 730 linked together can make up a version of 704; 734 is the control point of each 730 cell responsible for the wire connection, 733, length between each end point and specific programmable instructions for each end point to execute, 732; 731—Three dimensional view of 730; 735—Side profile cutaway view of a 733 configuration showing its makeup to only consist of a wire capable to conducting power, 739; 736—Side profile cutaway view of a 733 configuration showing its makeup to only consist of a wire capable to conducting power, 739 and an outer electro-optical coating to aid in its thermal blending with the background environment, 740; 737—Side profile cutaway view of a 733 configuration showing its makeup consisting of a wire capable to conducting power, 739, and an internal conduit, 741, to transmit commands to 732; 738—Side profile cutaway view of a 733 configuration showing its makeup consisting of a wire capable to conducting power, 739, and an internal conduit, 741, to transmit commands to 732 and an outer electro-optical coating to aid in its thermal blending with the background environment, 740.

Figure 7F:
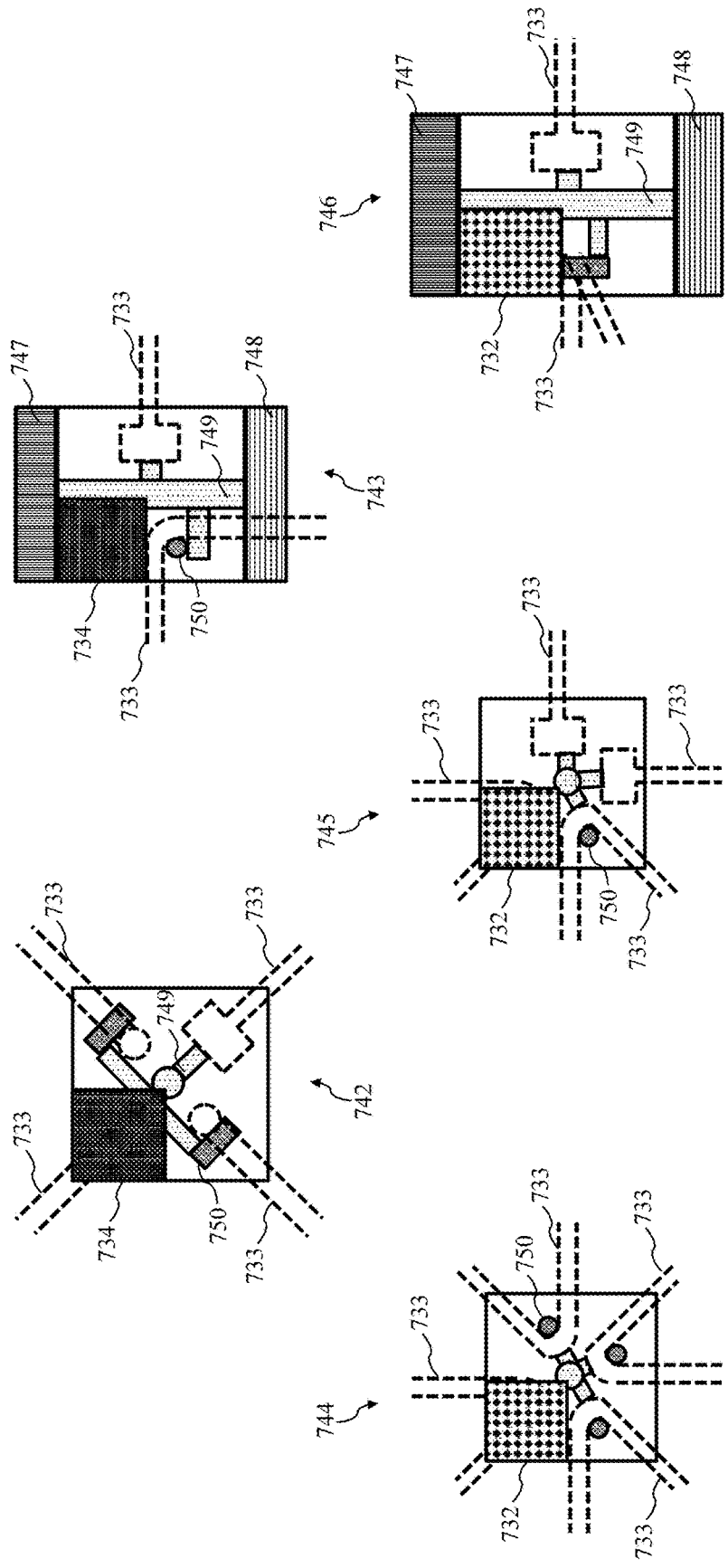
FIG. 7F shows the top down and profile cutaway views of a dynamic structure wire cell nodes.

FIG. 7F shows the top down and profile cutaway views of a dynamic structure wire cell nodes. Components shown in FIG. 7F are as follows: 742—Top down cutaway view of 734 showing 733 feed-through and termination points as well as power conduction points, 749, and wire tension points, 750; 743—Side profile cutaway view of 734 showing optional outer electro-optical coating to aid in its thermal blending with the background environment, 747, and optional internal electrical isolation coating, 748, to prevent wireless electrical coupling; 744—Top down cutaway view of 732 where all 733 are fed-through; 745—Top down cutaway view of 732 where only a portion of 733 are fed-through; 746—Side profile cutaway view of 731 showing optional outer electro-optical coating to aid in its thermal blending with the background environment, 747, and optional internal electrical isolation coating, 748, to prevent wireless electrical coupling.

Figure 7G:
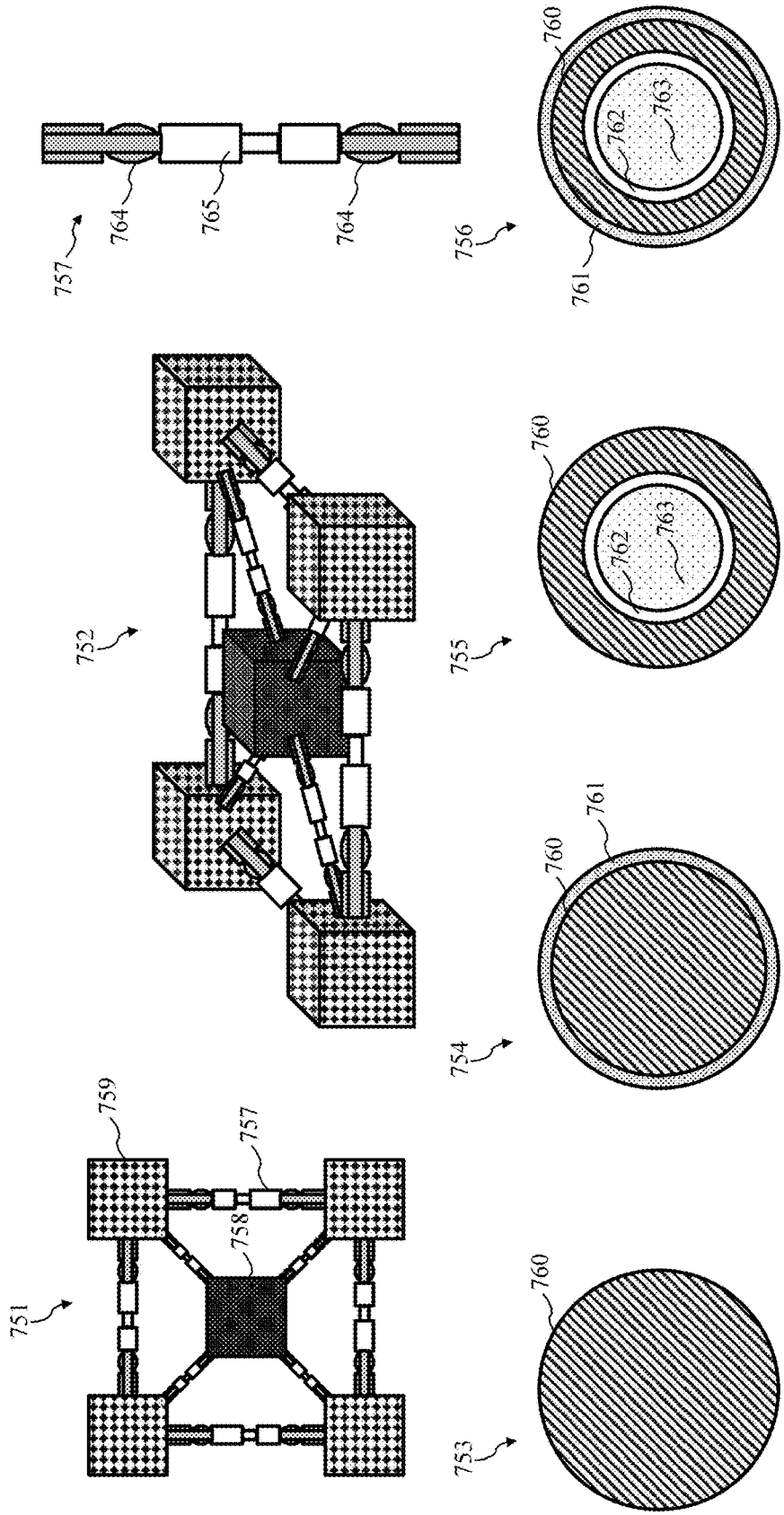
FIG. 7G shows the top down, three dimensional, and actuator cutaway views of a dynamic structure actuator cell.

FIG. 7G shows the top down, three dimensional, and actuator cutaway views of a dynamic structure actuator cell. Components shown in FIG. 7G are as follows: 751—Top down view of a actuator cell configuration, multiple of 751 linked together can make up a version of 704; 758 is the control point of each 751 cell responsible for the actuator connections, 757, length between each end point and specific programmable instructions for each end point to execute, 759; 752—Three dimensional view of 751; 757—Side profile view of an actuator showing its arms, 764, and telescoping rods, 765; 753—Side profile cutaway view of a 757 configuration showing its makeup to only consist of an actuator capable to conducting power, 760; 754—Side profile cutaway view of a 757 configuration showing its makeup to only consist of an actuator capable to conducting power, 760, and an outer electro-optical coating to aid in its thermal blending with the background environment, 761; 755—Side profile cutaway view of a 757 configuration showing its makeup consisting of an actuator capable to conducting power, 760, and an internal conduit, 762, to transmit commands 763; 756—Side profile cutaway view of a 757 configuration showing its makeup consisting of an actuator capable to conducting power, 760, and an internal conduit, 762, to transmit commands, 763, and an outer electro-optical coating to aid in its thermal blending with the background environment, 761.

Figure 7H:
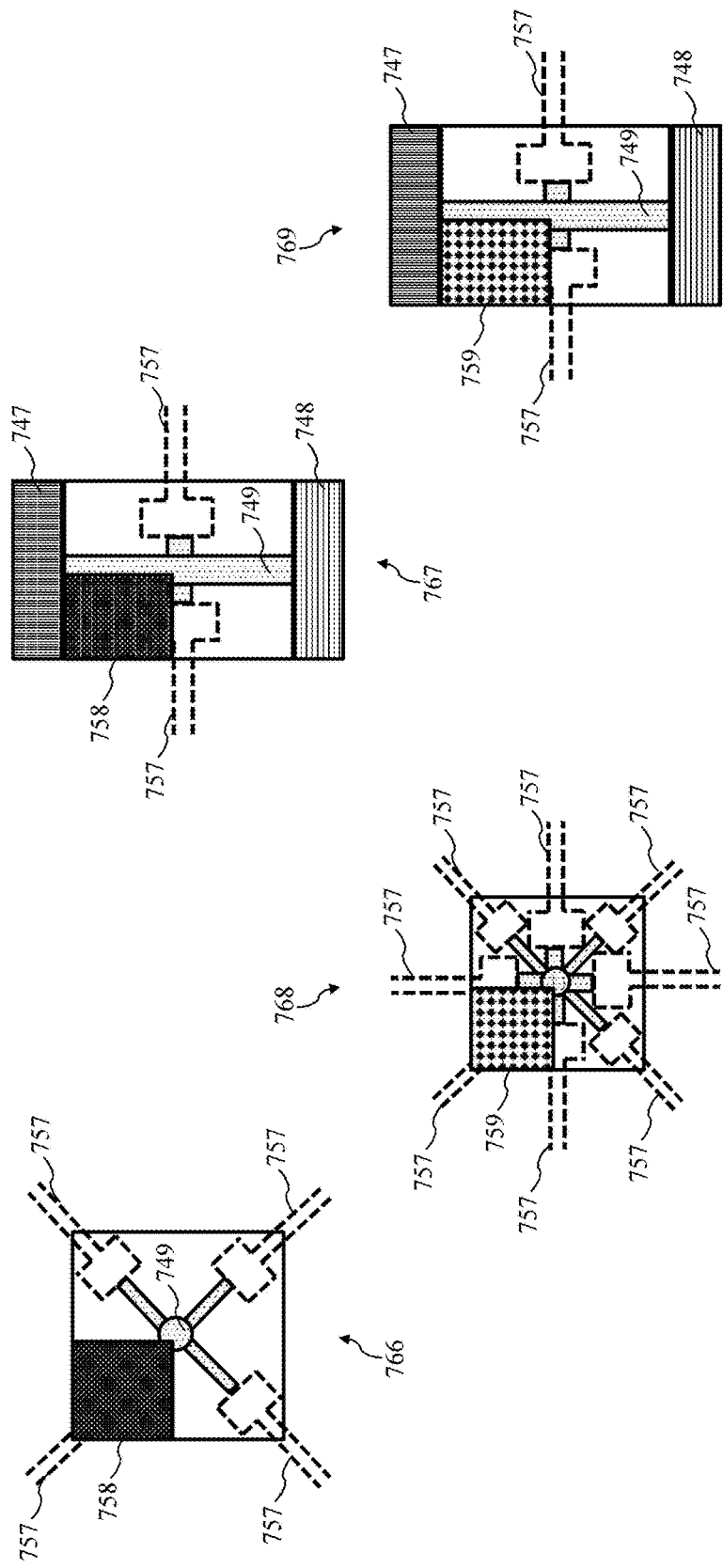
FIG. 7H shows the top down and profile cutaway views of a dynamic structure actuator cell nodes.
Figure 71:
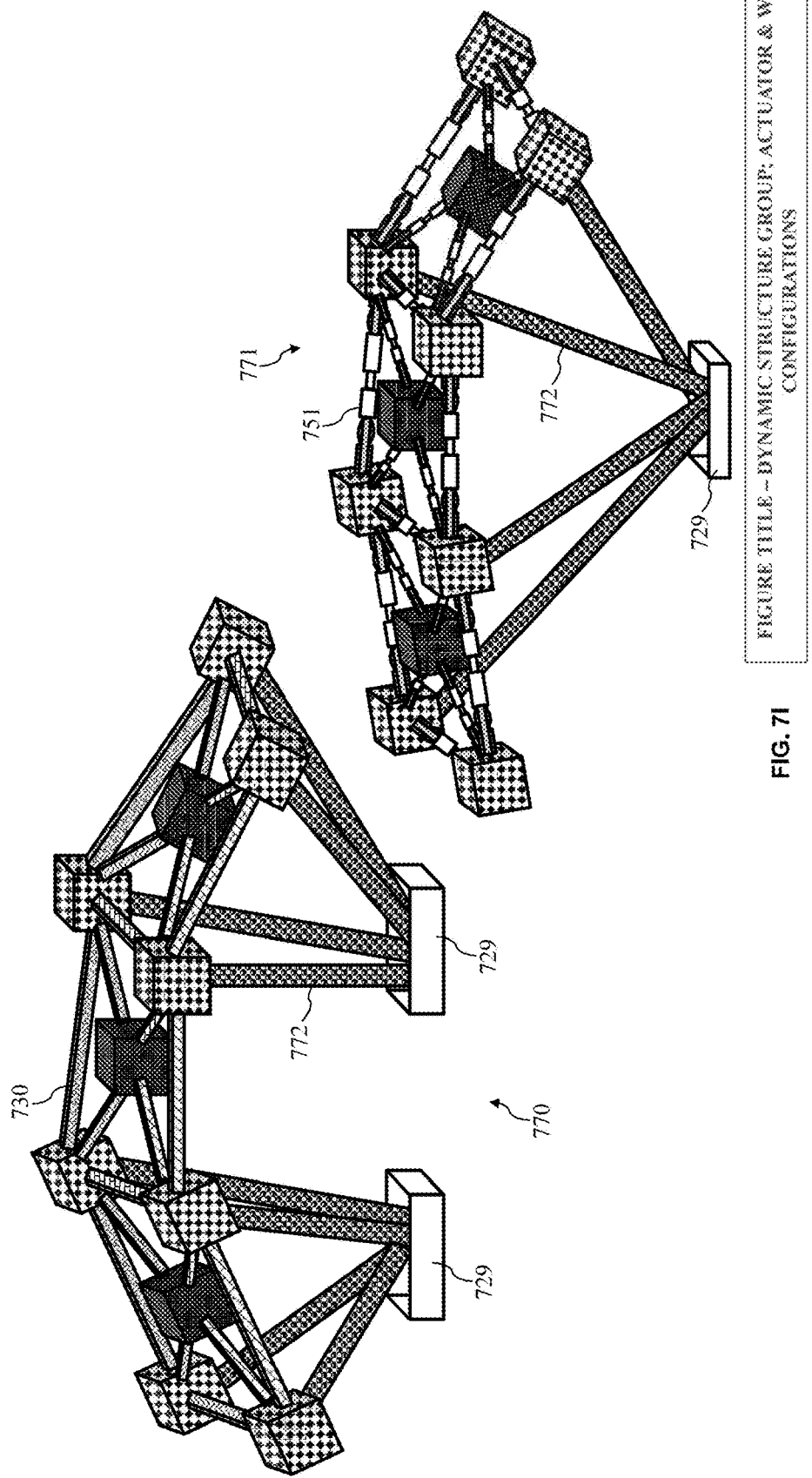

FIG. 7H shows the top down and profile cutaway views of a dynamic structure actuator cell nodes. Components shown in FIG. 7H are as follows: 766—Top down cutaway view of 758 showing 757 termination points as well as power conduction points, 749; 767—Side profile cutaway view of 758 showing optional outer electro-optical coating to aid in its thermal blending with the background environment, 747, and optional internal electrical isolation coating, 748, to prevent wireless electrical coupling; 768—Top down cutaway view of 759 showing all 757 termination points; 769—Side profile cutaway view of 759 showing optional outer electro-optical coating to aid in its thermal blending with the background environment, 747, and optional internal electrical isolation coating, 748, to prevent wireless electrical coupling.

FIG. 7I shows a three dimensional view of a dynamic structure configuration in a triplet wire and actuator cell group. Components shown in FIG. 7I are as follows: 770—Three dimensional view of a dynamic structure in a triple wire cell, 730, group; 771—Three dimensional view of a dynamic structure in a triple actuator cell, 751, group; 729—External control unit responsible for modifying the structures shape via structural supports, 772.

Figure 7J:
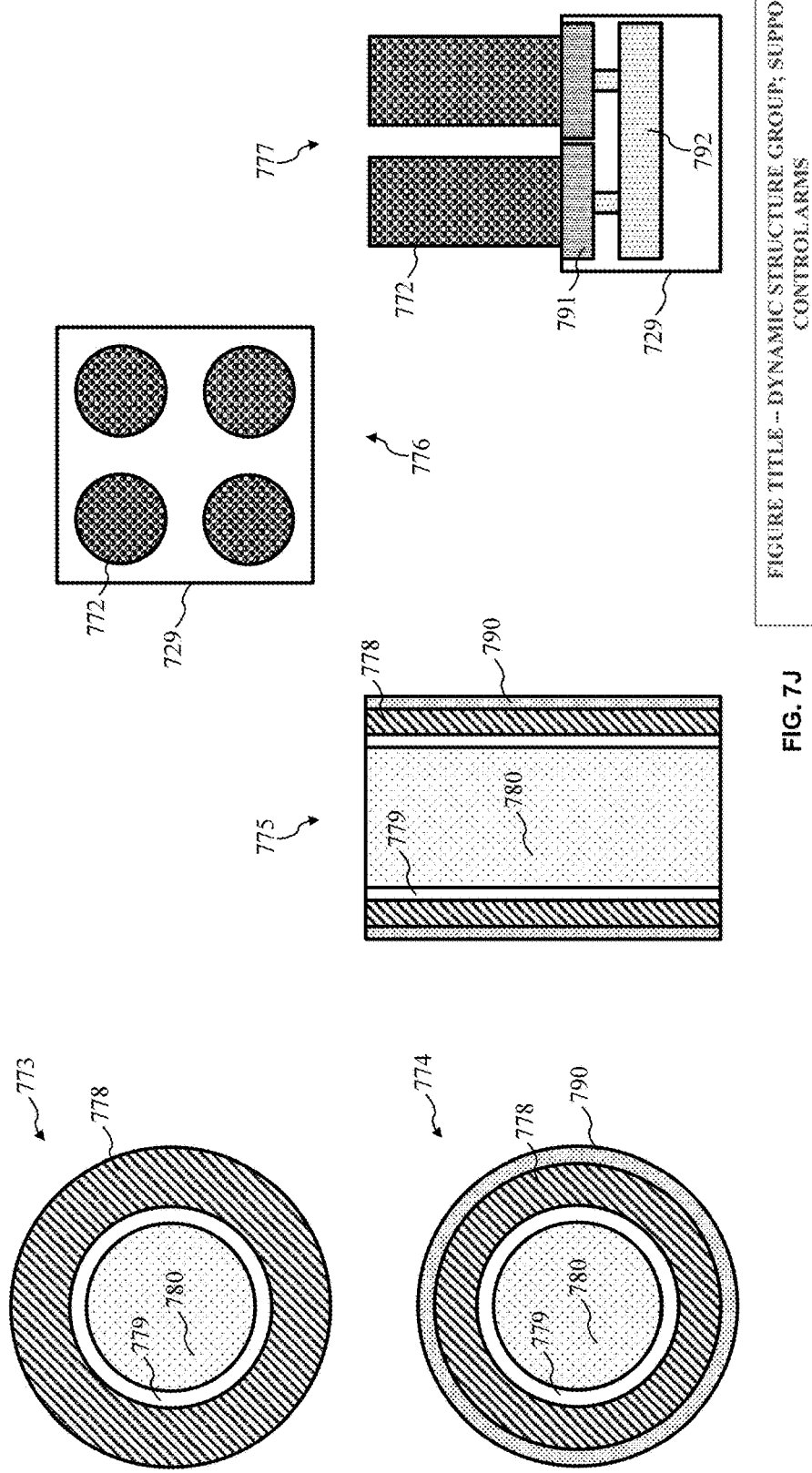
FIG. 7J shows a top down and profile cutaway view of the dynamic and static structural supports connecting the external shell to the system's flight control body.

FIG. 7J shows a top down and profile cutaway view of the dynamic and static structural supports connecting the external shell to the system's flight control body. Components shown in FIG. 7J are as follows: 773—Top down cutaway view of 772 showing external telescoping rod, 778, with an internal conduit, 779, to house wires, power, and data paths, 780; 774—Top down cutaway view of 772 showing external telescoping rod, 778, with an internal conduit, 779, to house wires, power, and data paths, 780, and an outer electro-optical coating to aid in its thermal blending with the background environment, 790; 775—Side profile cutaway of 774; 776—Top down cutaway view of 729 showing connections to various numbers of 722; 777—Side profile cutaway view of 729 showing control system for 722 movement, 791, and power/data management connections 792.

Figure 7K:
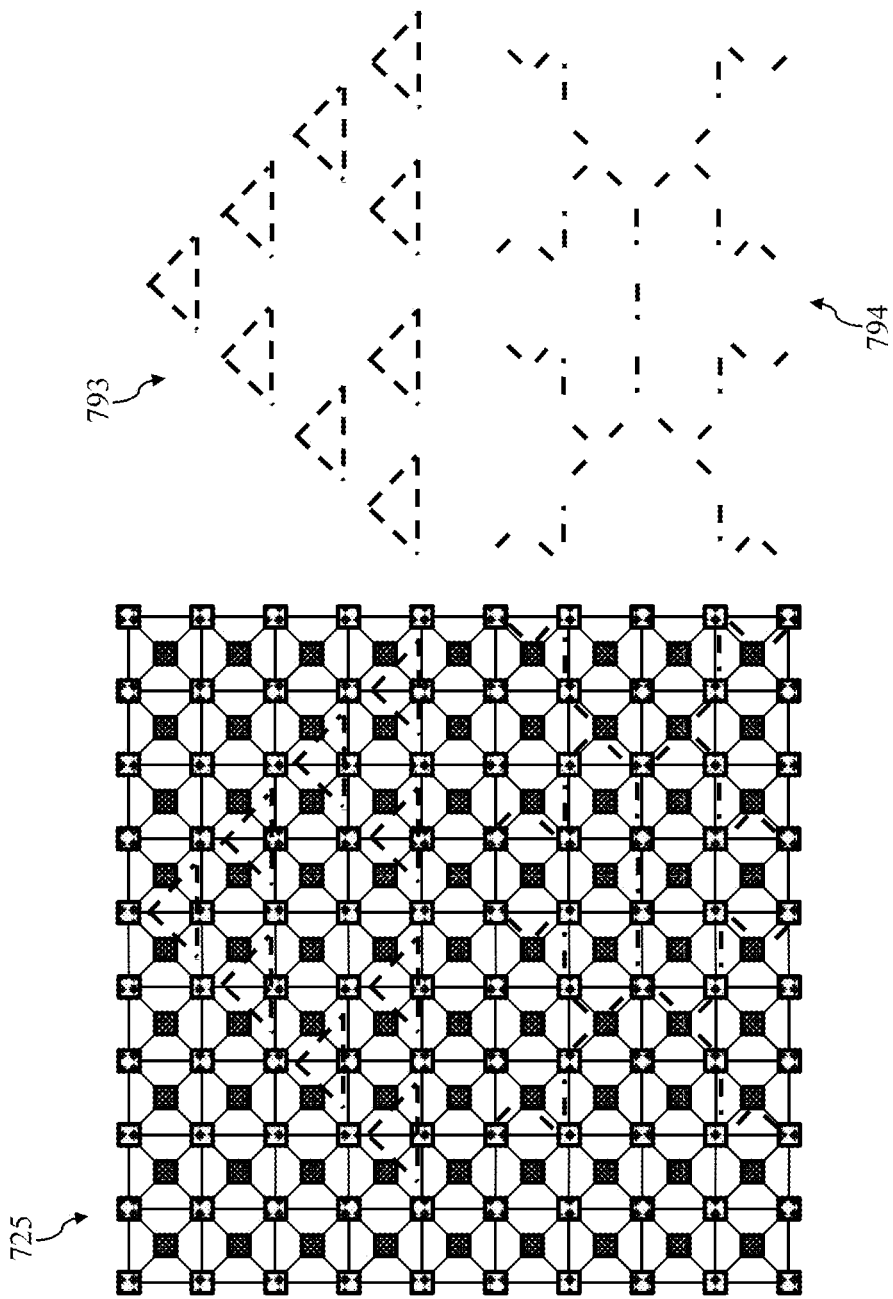
FIG. 7K shows a profile view of a static or dynamic structure allowing for flexible communication antenna configurations.

FIG. 7K shows a profile view of a static or dynamic structure allowing for flexible communication antenna configurations. 793 and 794 are possible programmable antenna configurations within the structure.

Figure 7L:
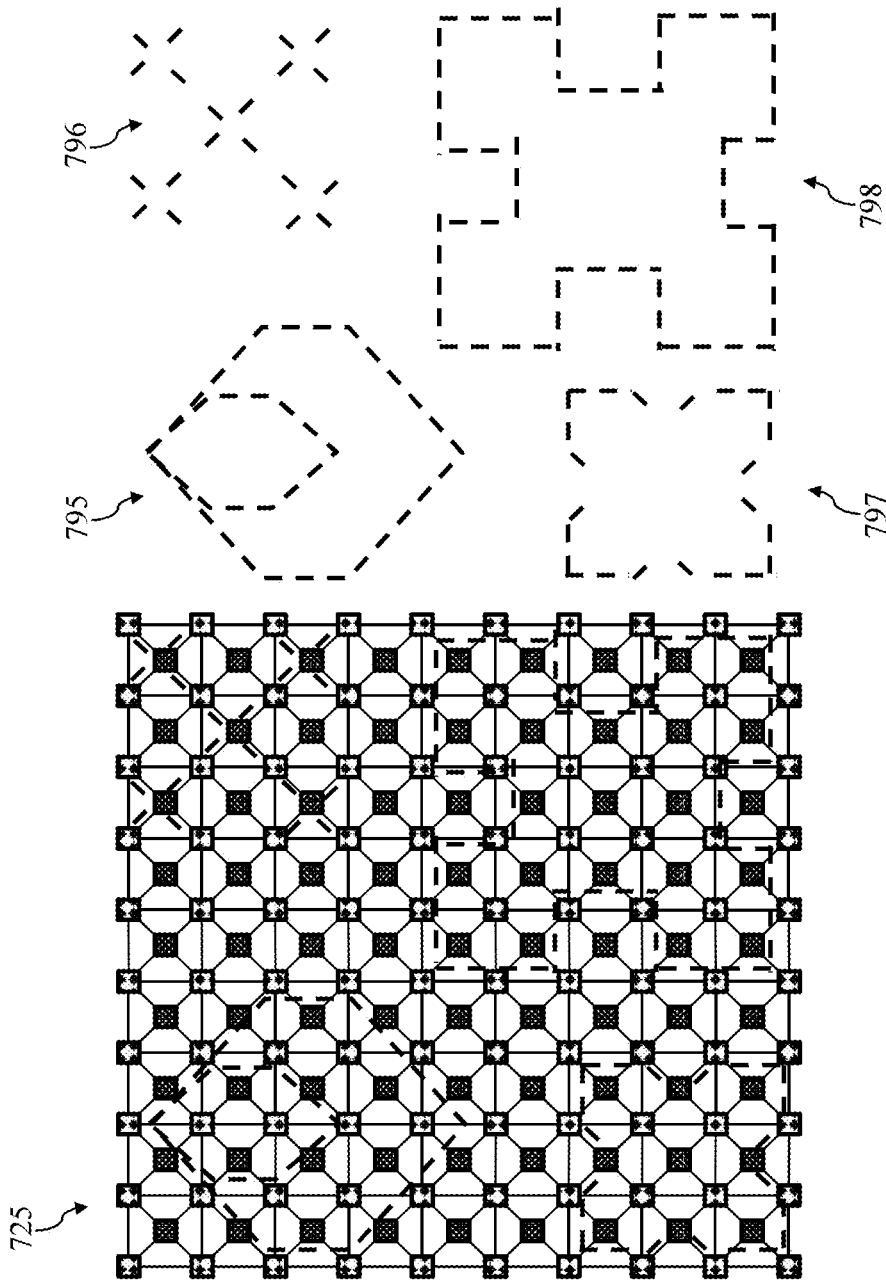
FIG. 7L shows an additional profile view of a static or dynamic structure allowing for flexible communication antenna configurations.

FIG. 7L shows an additional profile view of a static or dynamic structure allowing for flexible communication antenna configurations. 795, 796, 797, and 798 are additional possible programmable antenna configurations within the structure.

Figure 8A:
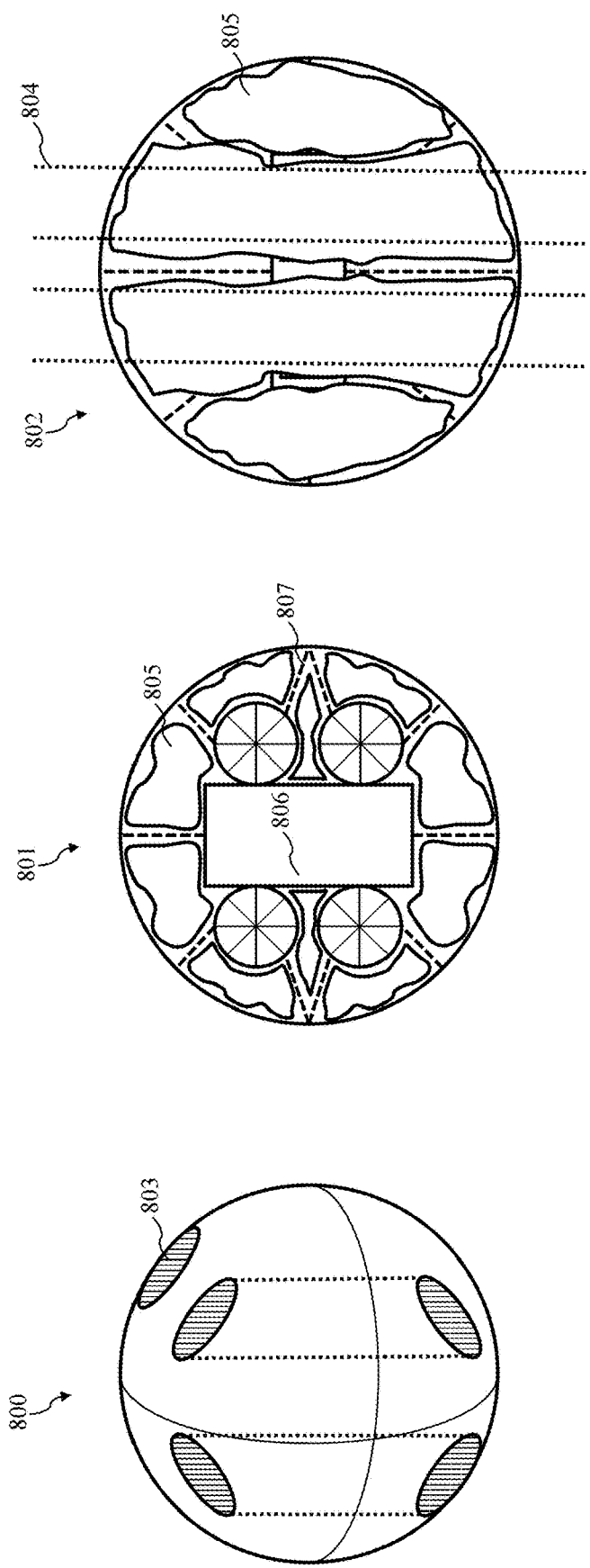
FIG. 8A shows a three dimensional, top down cutaway, and profile cutaway view of the system with the electro-optic/infrared internal blending system deployed with in a static spherical configuration.

FIG. 8A shows a three dimensional, top down cutaway, and profile cutaway view of the system with the electro-optic/infrared internal blending system deployed with in a static spherical configuration. Components shown in FIG. 8A are as follows: 800—Three dimensional view of a system in a spherical structure configuration with an internal electro-optic/infrared internal blending system, 805, deployed and the resulting propulsion cutouts, 803, to allow for aerodynamic maneuver; 801—Top down cutaway view of a system in a spherical structure configuration with an internal electro-optic/infrared internal blending system, 805, deployed and the resulting system command and control unit, 806, and structure connection points, 807; 802—Side profile cutaway view of a system in a spherical structure configuration with an internal electro-optic/infrared internal blending system, 805, deployed and the aerodynamic paths to allow for air flow and flight control, 804.

FIG. 8B shows a three dimensional, top down cutaway, and profile cutaway view of the system with the electro-optic/infrared internal blending system deployed with in a dynamic cubic configuration. Components shown in FIG. 8B are as follows: 808—Three dimensional view of a system in a cubic structure configuration with an internal electro-optic/infrared internal blending system, 805, deployed and the resulting propulsion cutouts, 803, to allow for aerodynamic maneuver; 809—Top down cutaway view of a system in a cubic structure configuration with an internal electro-optic/infrared internal blending system, 805, deployed and the resulting system command and control unit, 806, and structure connection points, 807; 810—Side profile cutaway view of a system in a cubic structure configuration with an internal electro-optic/infrared internal blending system, 805, deployed and the aerodynamic paths to allow for air flow and flight control, 804.

Figure 9:
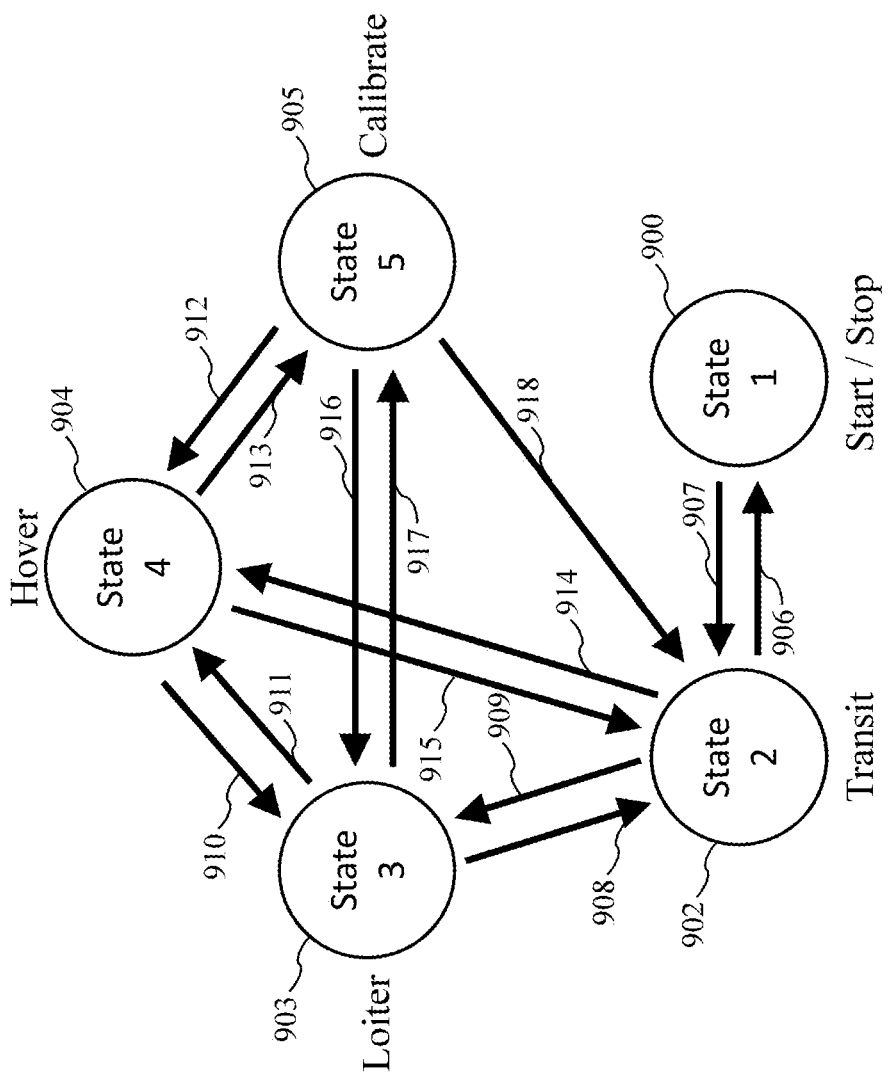
FIG. 9 shows a system behavior state diagram for operational modes.

FIG. 9 shows a system behavior state diagram for operational modes. Components shown in FIG. 9 are as follows: 900—State 1, also known as the Start/Stop state; 900 is in charge of take-off and landing operations, mission initialization methods, and system self-health checks; Once 900 is ready, it transitions to 902, via a go signal, 907; 900 will also begin if a stop signal, 906, is received from 902; 902—State 2, also known as the Transit state; 902 occurs when the system has to travel to a location to conduct its mission; Once at the proper location, the system can either loiter, 903, by sending the proper control signal, 909, or the system can hover, 904, by sending a hold position command, 914; 903—State 3, also known as the Loiter state; While in a hold pattern, 903, the system can be command to return home via a transit home command, 908, begin calibration/mission task, 905, via an execute task command, 917, or can enter a hold position, 904, via a hover command 910; 904—State 4, also known as the Hover state; Similar to other states, the system can either proceed to 902, 903, or 905 via 914, 910, or 913 respectively; 905—State 5, also known as the Calibrate state; Similar to other states, the system can either proceed to 904, 903, or 902 via 912, 916, or 918 respectively.

Although the invention has been described in detail with reference to certain preferred embodiments, variations and modifications exist within the spirit and scope of the invention as described and defined in the following claims.

The invention claimed is:

1. A radio and/or optical frequency signature management and calibration system comprising:
   one or more radio and optical frequency emitter sources;
   one or more radio and optical frequency receiver destinations; and
   a target system comprising:
      a power receiving, generation, distribution, storage and control subsystem;
      a propulsion control subsystem;
      a flight stabilization and control subsystem;
      a communications subsystem;
      a command and control subsystem;
      a payload management subsystem;
      a structure management subsystem;
      a sensor collection, reporting, and feedback subsystem; and
      a mission tasking management subsystem;
   wherein said one or more radio and optical frequency emitter sources comprises an external radio and optical frequency structure mesh shield comprising gaps that are spaced to achieve total reflection in order to mimic a radar return of a solid object while still allowing for air to flow through said external mesh shield to enhance aerodynamics, reduce drag, and blend its electro-optical/infrared signature with the background environment.

2. The system of claim 1, wherein said target system manages external radio and/or optical signature presence;
   manages external radio and optical signature presence;
   mitigates and blocks unwanted external signal intrusions and undesired internal target system signal emissions;
   maintains aerodynamic requirements for control surfaces and propulsion thrust flows to ensure stable flight; and
   executes user and/or mission tasking and payload deployment autonomously, semi-autonomously, and/or manually.

3. The system of claim 2, wherein said target system comprises a power receiving, generation, distribution, storage, and control subsystem;
   wherein said subsystem controls on-board target system for power via battery, photovoltaic, and/or combustion;
   controls off-board target system second or third party provided power via wireless radio and/or optical transfer methods or via tethered cable, cord, and/or fiber.

4. The system of claim 3, wherein said target system propulsion control subsystem comprises a first operating profile for target system transit, loiter, hover, take-off, and landing for target system configurations; and
   a second operating profile for towed cable, cord, and/or fiber.

5. The system of claim 4, wherein said target system flight stabilization and control subsystem controls target system control surfaces to ensure flight stability for said first operating profile; and
   controls target system calibration stabilizer relay for target system configuration powered via said second operating profile.

6. The system of claim 1, wherein said target system communications subsystem controls external target system data link interfaces with base or mobile command and control stations;
   controls radio frequency communication antenna pattern, design, spacing, orientation, protocol, transmit/receive windows, and frequency allocation; and
   controls optical frequency communication waveform, power level, beam intensity, beam pattern, orientation, protocol, transmit/receive windows, and frequency allocation.

7. The system of claim 1, wherein said target system command and control subsystem manages said subsystems within said target system to include scheduling, task execution, system fault detection and isolation, on-board resource allocation, sensor integration, mission execution, and payload deployment;
   records data for post-event construction and/or analysis;
   executes target system self-harm protection override; and
   executes target system abandonment safety procedures and security protections.

8. The system of claim 1, wherein said target system payload management subsystem controls the scheduling, monitoring, stowage, fault detection and isolation, deployment, assessment, and tear-down of internal payloads within the target system structure; and
   controls the scheduling, monitoring, stowage, fault detection and isolation, deployment, and assessment of external payloads to the target system structure.

9. The system of claim 1, wherein said target system structure management subsystem controls static and dynamic target system structure interface points to said target system body;
   interfaces with said communication subsystem to schedule signature control and calibration windows to mitigate undesired target system operation; and
   controls dynamic operation of said target system structure to ensure proper shaping and frequency management via gap spacing size.

10. The system of claim 1, wherein said target system sensor collection, reporting, and feedback subsystem monitors and reports data and information related to device orientation, distance, state, fault detection and isolation issues, environmental interactions to a requesting subsystem or external system requestor;

executes and validates sensor readings on a scheduled, ad-hoc, as-needed/request, and/or random interval;

monitors, reports, and recommends target system operating state changes due to malfunction, exploitation, and/or abandonment; and records sensor data for post-event construction and/or analysis.

11. The system of claim 1, wherein said target system mission tasking management subsystem executes all relevant mission files detailing required tasking;

manages and de-conflicts competing and/or conflicting mission tasking; and updates and adapted to dynamic mission tasking.

12. The system of claim 2, wherein said target system manages external radio and optical signature presence by ensuring a gap size of a radio frequency structure mesh shield to be a fraction of an inspection or calibration frequency wavelength;

adjusting said gap size of said radio frequency structure mesh shield to be a fraction of said inspection or calibration frequency wavelength through tightening or loosening of individual wire dynamic structure cells;

adjusting said gap size of said radio frequency structure mesh shield to be a fraction of said inspection or calibration frequency wavelength through shortening or lengthening of individual actuator dynamic structure cells;

orienting said target system radio frequency structure mesh shield return surface to said receiver destination(s) for desired radar signature detection and measurement;

reshaping said target system radio frequency structure mesh shield return surface to said receiver destination(s) for desired radar signature detection and measurement through changing of individual wire and actuator dynamic structure cells and their supporting control arms;

coating said radio frequency structure mesh shield, wire and actuator dynamic structure cells, supporting control arms, and target system internals with electro-optical/infrared treatments to match said inspection or calibration frequency wavelength;

controlling electro-optical/infrared emitting diodes embedded within said wire and actuator dynamic structure cells to said inspection or calibration frequency wavelength;

tuning ionized gas plasma chambers embedded within said wire and actuator dynamic structure cells to said inspection or calibration frequency wavelength;

inflating said electro-optical/infrared blending structure within said radio frequency structure mesh shield to encapsulate said target system internals while maintaining aerodynamic and propulsion flow requirements for flight stability and control;

controlling said target system radio frequency structure mesh shield to create communication antennas of various frequencies to provide external communication with said target system;

controlling said electro-optical/infrared emitting diodes embedded within said wire and actuator dynamic structure cells to provide external communication with said target system; and controlling said ionized gas plasma chambers within said wire and actuator dynamic structure cells to provide external communication with said target system.

13. The system of claim 2, wherein said target system mitigates and blocks unwanted external signal intrusions and undesired internal target system signal emissions by adjusting a gap size of a radio frequency structure mesh shield to be a fraction of an unwanted signal frequency wavelength through tightening or loosening of individual wire dynamic structure cells;

adjusting said gap size of said radio frequency structure mesh shield to be a fraction of said unwanted signal frequency wavelength through shortening or lengthening of individual actuator dynamic structure cells;

adjusting power isolation coupling characteristics attaching said target system internals to said radio frequency structure mesh shield;

adjusting said ionized gas plasma chambers within wire and actuator dynamic structure cells for maximum signal absorption;

controlling said target system radio frequency structure mesh shield to continuously adjust communication antenna frequencies;

controlling electro-optical/infrared emitting diodes embedded within said wire and actuator dynamic structure cells to continuously adjust a communication frequency; and controlling said ionized gas plasma chambers within said wire and actuator dynamic structure cells to continuously adjust said communication frequency.

14. The system of claim 2, wherein said target system maintains aerodynamic requirements for control surfaces and propulsion thrust flows to ensure stable flight target system self-control of throttle, yaw, pitch, and roll for all operating profiles except said second operating profile;

by controlling upper and lower inboard ailerons, upper and lower outboard ailerons, red ailerons, center ailerons, green ailerons, upper rudders, center rudders, lower rudders, red and green inboard rudders, green and red outboard rudders, and their associated tabs control surfaces within said target system radio frequency structure mesh shield for the second operating profile; and by controlling said red and green ailerons, red and green rudders and associated tabs control surfaces on a calibration stabilizer relay for the second operating profile.

15. The system of claim 2, wherein said target system executes user and/or mission tasking and payload deployment autonomously, semi-autonomously, and/or manually utilizing static or dynamic onboard mission data file execution;

sensor feedback for target system health, status, location, collision avoidance, fault detection and isolation, and abandonment procedures; and coordination with other entities through various onboard communication methods.

\* \* \* \* \*